(12) United States Patent
Tannenbaum

(10) Patent No.: US 9,373,943 B1
(45) Date of Patent: Jun. 21, 2016

(54) MODULAR ELECTRICAL RACEWAY FOR BUILDINGS

(71) Applicant: Jerome S Tannenbaum, Nashville, TN (US)

(72) Inventor: Jerome S Tannenbaum, Nashville, TN (US)

(*) Notice: Subject to any disclaimer, the term of this patent is extended or adjusted under 35 U.S.C. 154(b) by 0 days.

(21) Appl. No.: 13/938,198

(22) Filed: Jul. 9, 2013

Related U.S. Application Data

(60) Provisional application No. 61/669,499, filed on Jul. 9, 2012.

(51) Int. Cl.
*H02G 3/04* (2006.01)

(52) U.S. Cl.
CPC .................................. *H02G 3/0437* (2013.01)

(58) Field of Classification Search
CPC ....................................................... E04C 1/397
USPC ............ 439/207, 139; 174/84, 258, 371, 481; 361/782
See application file for complete search history.

(56) References Cited

U.S. PATENT DOCUMENTS

| | | | | |
|---|---|---|---|---|
| 3,725,568 A | * | 4/1973 | Stanley | H02G 3/281 174/491 |
| 4,104,710 A | | 8/1978 | Damico et al. | |
| 5,149,277 A | * | 9/1992 | LeMaster | H01R 25/00 439/207 |
| 5,248,850 A | * | 9/1993 | Laney | 174/669 |
| 6,305,556 B1 | * | 10/2001 | Mayer | 211/26 |
| 6,492,594 B1 | * | 12/2002 | Magyar | H02G 3/0608 174/480 |
| 6,945,821 B2 | | 9/2005 | Stoner et al. | |
| 7,092,376 B2 | | 8/2006 | Schuman | |
| 7,544,900 B2 | * | 6/2009 | Makwinski | H02G 3/0431 174/480 |
| 7,679,007 B1 | | 3/2010 | Walker et al. | |
| 7,822,311 B2 | * | 10/2010 | Stansbury et al. | 385/135 |
| 7,950,189 B1 | | 5/2011 | Walker et al. | |
| 2003/0194910 A1 | | 10/2003 | Stoner et al. | |
| 2004/0080903 A1 | * | 4/2004 | Byrne | 361/683 |
| 2005/0057342 A1 | | 3/2005 | Haynes | |
| 2008/0012716 A1 | | 1/2008 | Saltzstein et al. | |
| 2009/0047893 A1 | | 2/2009 | Zimmerman | |
| 2009/0163066 A1 | | 6/2009 | Vanzo | |
| 2009/0313046 A1 | | 12/2009 | Badgett et al. | |
| 2010/0095604 A1 | | 4/2010 | Newkirk et al. | |
| 2010/0229472 A1 | | 9/2010 | Malpas | |
| 2010/0328853 A1 | | 12/2010 | Johnson et al. | |
| 2012/0002356 A1 | | 1/2012 | Linnane et al. | |
| 2012/0194952 A1 | | 8/2012 | Crucs | |
| 2012/0258655 A1 | | 10/2012 | Carnell et al. | |
| 2013/0061538 A1 | | 3/2013 | Hunt et al. | |

OTHER PUBLICATIONS

U.S. Appl. No. 13/938,210, entitled "Prefabricated Multitrade Building Panel Apparatus", filed Jul. 9, 2013 by Jerome S. Tannenbaum.
U.S. Appl. No. 13/938,214, entitled "Prefabricated Medical Headwall Building Panel Apparatus", filed Jul. 9, 2013 by Jerome S. Tannenbaum.
U.S. Appl. No. 13/938,217, entitled "Prefabricated Multitrade Subassembly Building System and Methods", filed Jul. 9, 2013 by Jerome S. Tannenbaum.

* cited by examiner

*Primary Examiner* — William H Mayo, III
*Assistant Examiner* — Krystal Robinson
(74) *Attorney, Agent, or Firm* — Ryan D. Levy; Patterson Intellectual Property Law, P.C.

(57) ABSTRACT

A modular raceway apparatus provides a pre-wired electrical sub-assembly for on-site installation in a building or installation a pre-fabricated building component. The raceway apparatus includes normal power and emergency power tracks. Each power track includes internal wiring connected to one or more connectors for plug-and-play interconnectivity with independent power supplies and other electrical component wiring members. Each raceway track includes multiple track members separated by gaps and a coupling.

21 Claims, 21 Drawing Sheets

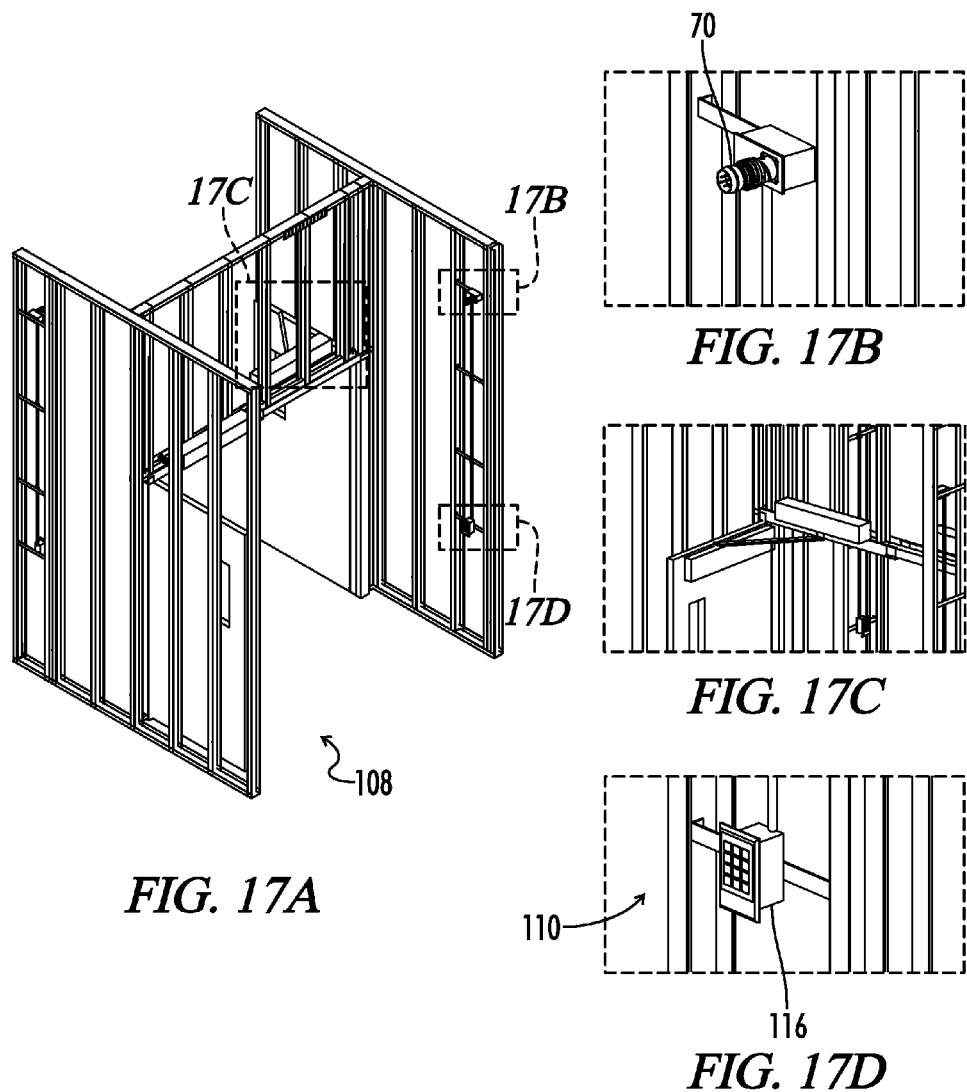

MODULAR ELECTRICAL RACEWAY FOR BUILDINGS

CROSS-REFERENCES TO RELATED APPLICATIONS

This nonprovisional utility patent application claims benefit of and priority to U.S. provisional patent application No. 61/669,499 filed Jul. 9, 2012 entitled Pre-Fabricated Multi-Trade Sub-Assembly System and Methods, all of which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

1. Technical Field

The present invention relates generally to devices and methods for constructing buildings and more particularly to electrical raceways for assembling buildings such as healthcare facilities.

2. Related Art

Building systems for constructing buildings are known in the art and typically include various raw materials that are assembled on-site at a building construction location. A contractor or construction firm manages delivery of desired building components such as wood, bricks, tile, flooring, roofing, electrical hardware, plumbing hardware, etc. Once the raw building materials for each stage of construction are delivered to a construction location, a team of laborers from various trades who manually assemble the various components of the building, beginning with a frame and foundation. Additionally skilled workers are brought in for each stage of construction. The current method for the construction of buildings relies heavily on skilled labor at the job site. For example, electricians are employed to assemble and install the electrical hardware, plumbers are employed to assemble and install the plumbing system, roofers are employed to assemble a roof, etc. Furthermore, the current method of construction is very sequential in that each skilled trade must be sequenced to perform their work at various time points during the construction process. The performance of various tasks is critically dependent on the completion of other tasks. A process that places less reliance on the critical pathways of the traditional construction process will result in lower cost and shorter times for the completion of a construction project. For example, in the traditional approach to construction the electrical, plumbing, and duct rough-in cannot be installed until the stud walls and roof deck are installed. A method which pre-fabricates portions of the stud-walls and overhead electrical, plumbing, and duct rough-in will allow these rough-in activities to proceed independently of the erection of stud walls or roof decks at the construction site.

In a single building project such as a hospital, many rooms include the similar features regardless of the layout of the room. For example, patient rooms in a hospital typically include electrical outlets, plumbing fixtures, data connections, and outlets/drains for various medical liquids and gases. In many applications, considerable time and expense could be saved if such rooms or parts of rooms could be pre-assembled off-site as pre-fabricated sub-assemblies and installed and connected to each other at the construction location.

Additionally, many of the individual building components for healthcare facilities are common, regardless of geographic location or facility size. In conventional systems, such components are traditionally installed on-site using raw materials. However, considerable time and expense could also be saved if such components could be pre-assembled offsite as pre-fabricated sub-assemblies and joined with other components at the construction location.

Hospitals and healthcare facilities have complex power distribution requirements. These include the provision of normal power (not on emergency backup), critical branch power (backed up by an emergency power source), life safety branch power (also backed up by an emergency power source, but fed from a separate Automatic Transfer Switch), equipment branch power (to separate equipment power from other normal and emergency power circuits), and low voltage circuits. Every patient room, operating room, procedure room, laboratory work area, and imaging room in a hospital requires a branch circuit providing power from all of these power sources and types.

The cost of installing these branch circuits is significant and time consuming. It is not uncommon for the cost of electrical power wiring to equal at least 20% of the construction budget for a new hospital.

Additionally, the face of each power outlet is typically labeled with the name of the electrical distribution panel and the circuit number within that panel. Conduit and junction boxes are frequently labeled with a color code as to the type of power (e.g. critical branch, normal, etc.) but are often not labeled with the specific panel and circuit number, making it difficult to trace a fault in a particular circuit.

What is needed, then, are improvements in devices and methods for assembling buildings, and in particularly, for assembling health-care facilities.

BRIEF SUMMARY

In some embodiments, the present disclosure provides a modular wall panel unit having one or more electrical hardware components and an electrical connector plug pre-installed thereon. The component is attached to the connector plug. The unit also includes a frame configured for attachment to a conventional building frame in a wall of a building. The connector plug is disposed at a location on the unit above a ceiling line for a ceiling that is positioned near the panel unit. The hardware component may be positioned at a standardized location corresponding to a medical or healthcare facility building code.

In some embodiments, the present disclosure further provides a modular electrical raceway configured for modular installation in a building. The raceway unit includes a normal power track and an emergency power track. Each track includes independent wiring configured for attachment to independent power supplies. One or more connector plugs are disposed on each track for attachment to branch circuits. In some embodiments, each raceway unit is configured to be electrically connected to one or more modular wall panel units.

An object of the present disclosure is to reduce the time and cost of wiring the circuit branches of a hospital or healthcare facility during new construction and/or renovation.

Another object of the present disclosure is to assure the proper identification of each circuit from the electrical distribution panel to the outlet or junction box device, and every step in between, for improved ease of maintenance compared with conventional methods of labeling and circuit testing.

A further object of the present disclosure is to facilitate the use of pre-fabricated building sections in the construction and renovation of hospitals or healthcare facilities.

An additional object of the present disclosure is to provide a means for improved seismic protection for the electrical branch distribution circuits in hospitals.

Numerous other objects, features and advantages of the present disclosure will be readily apparent to those skilled in the art upon a reading of the following description when taken in conjunction with the accompanying drawings.

BRIEF DESCRIPTION OF THE DRAWINGS

FIG. 17A illustrates a perspective view of an alternative embodiment of a modular wall panel unit.

FIG. 17B illustrates a detail perspective view of an alternative embodiment of a modular wall panel unit.

FIG. 17C illustrates a detail perspective view of an alternative embodiment of a modular wall panel unit.

FIG. 17D illustrates a detail perspective view of an alternative embodiment of a modular wall panel unit.

DETAILED DESCRIPTION

Figure 1:
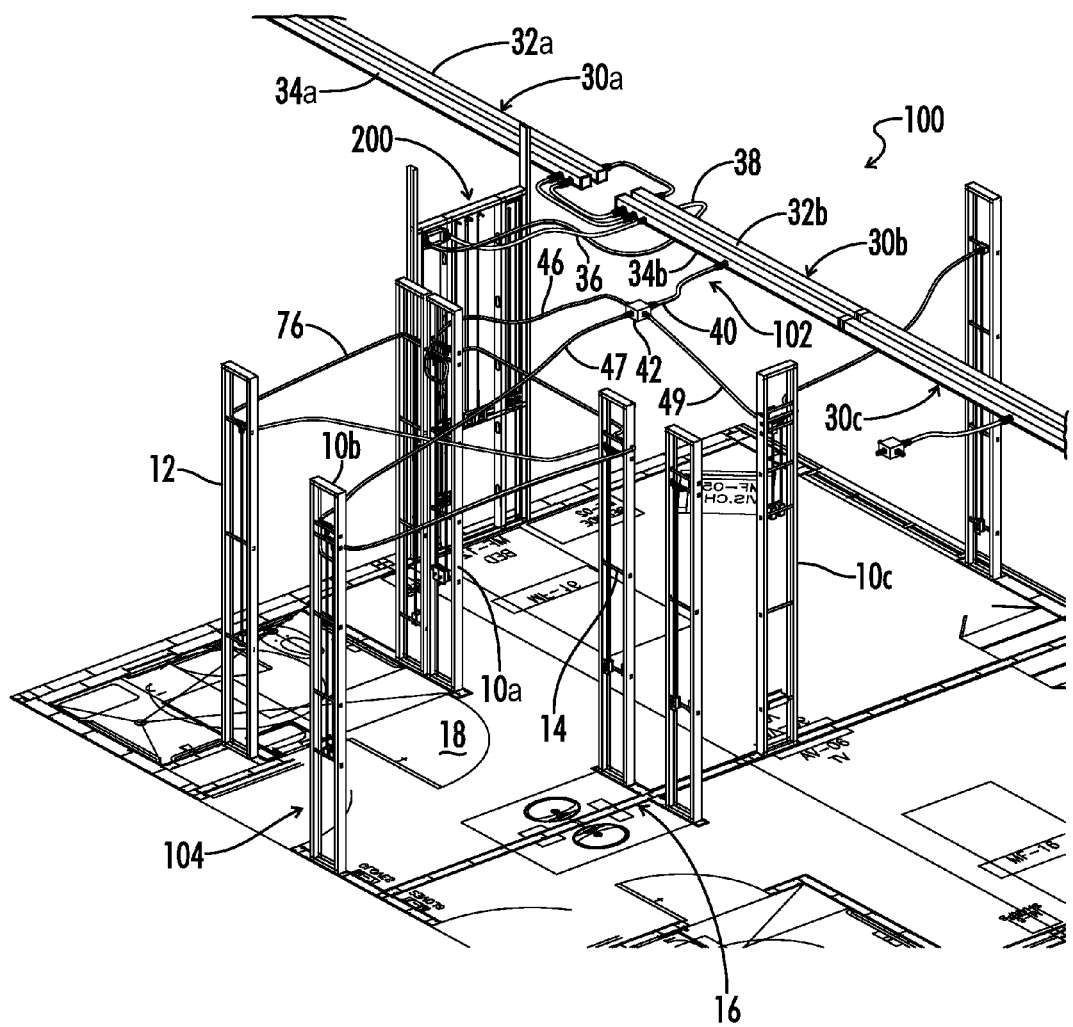
FIG. 1 illustrates a perspective view of an embodiment of a modular building system in accordance with the present disclosure.

Referring now to the drawings, FIG. 1 illustrates an exemplary embodiment of a modular building system 100 in accordance with the present disclosure. Building system 100 includes a plurality of modular wall panel units 10a, 10b, 10c that may be prefabricated and prewired prior to installation at a construction location. Each wall panel unit 10 includes electrical, plumbing and/or communication hardware pre-installed such that the panel may be shipped to a construction location and subsequently connected to a corresponding electrical, plumbing or communication system. Each modular wall panel unit 10 includes a metal frame in some embodiments and can be positioned at a location on a floor plan 16 at a desired use location for the hardware features installed thereon.

Multiple branch circuit connectors 40 are attached to each local raceway unit for providing a branch circuit to individual rooms or groups of rooms in the building. Each branch circuit may include a plurality of electrical hardware components such as electrical plugs, lighting components, and switches.

In an exemplary embodiment, referring further to FIG. 1, a modular electrical raceway system 102 can be used to distribute electrical power to modular wall panel units 10. Raceway system 102 includes a plurality of modular electrical raceway units 30a, 30b, 30c, etc. that can be electrically interconnected to provide a plug-and-play type electrical system. Each raceway unit 30 includes one or more connector plugs on a side or end of the raceway for electrically interconnecting to other raceway units or other components such as wall units 10 in a modular arrangement.

Referring again to FIG. 1, in some embodiments, each modular raceway unit 30 is installed in a ceiling space above a floor 18. Ceiling panels may be installed at an elevation below each raceway unit 30 such that raceway units 30 are not visible from within the rooms.

Each modular wall panel unit 10 may be connected to a corresponding raceway unit 30 by one or more electrical connector cables. Each connector cable may include an electrical connector such as a single or multi-strand conductive wire or cable. In alternative embodiments, connector cables may include a mechanical connector such as a duct or plumbing conduit or pipe, or a communications connector such as a communications cable.

In some embodiments, electrical connector plugs used for engaging the ends of connector cables include UL listed circular, or socket, connectors which conform to the performance standards of Mil-Spec MIL-DTL-5015 and its associated updates, with a surface mount bezel and a bayonet connection. The conductor wires are permanently connected with a crimped pin that is inserted into the isolator of a housing shell. The electrical connector plugs are designed to withstand temperatures ranging from about −67° F. to about +257° F. in some embodiments, and to withstand significant shock and vibration meeting the performance standards of Mil-Spec MIL-810c., These performance standards have been adopted to insure that the electrical connections will remain intact under the most rigorous environmental conditions. In other embodiments, various other suitable connectors may be used. Such connectors may provide improved performance in the event of an earthquake or other seismic activity.

Figure 2:
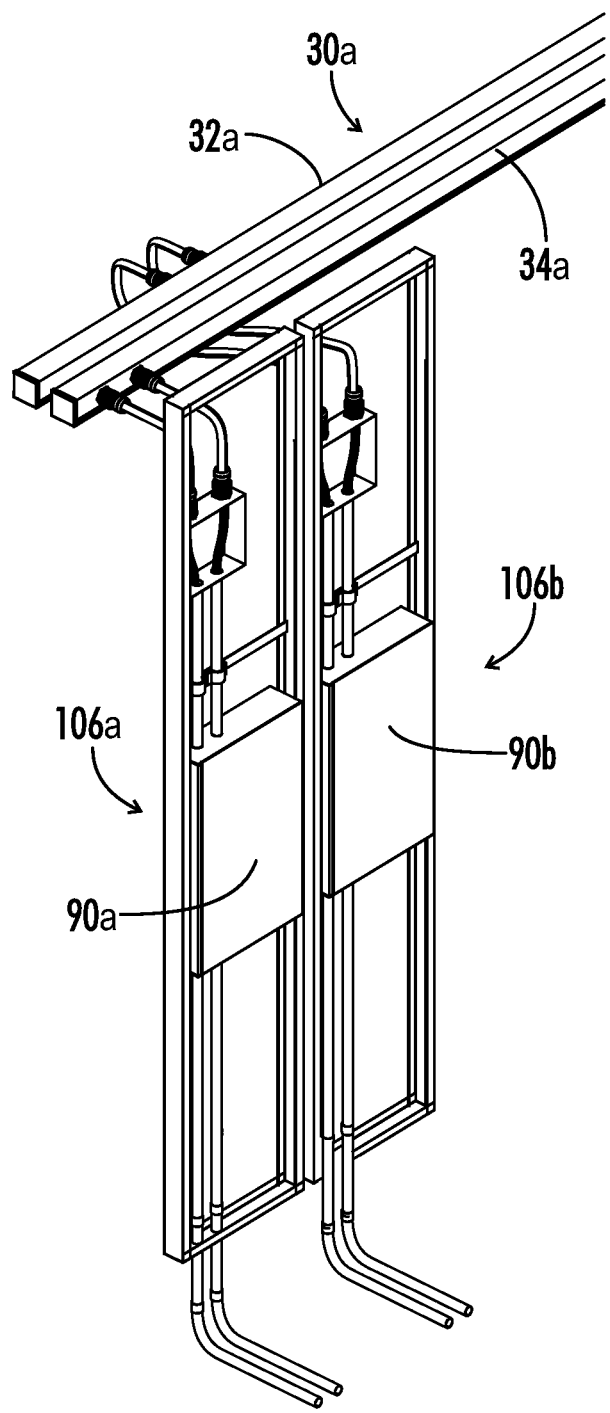
FIG. 2 illustrates a perspective view of an embodiment of a local raceway unit attached to normal and emergency power supply circuit panels.
Figure 3:
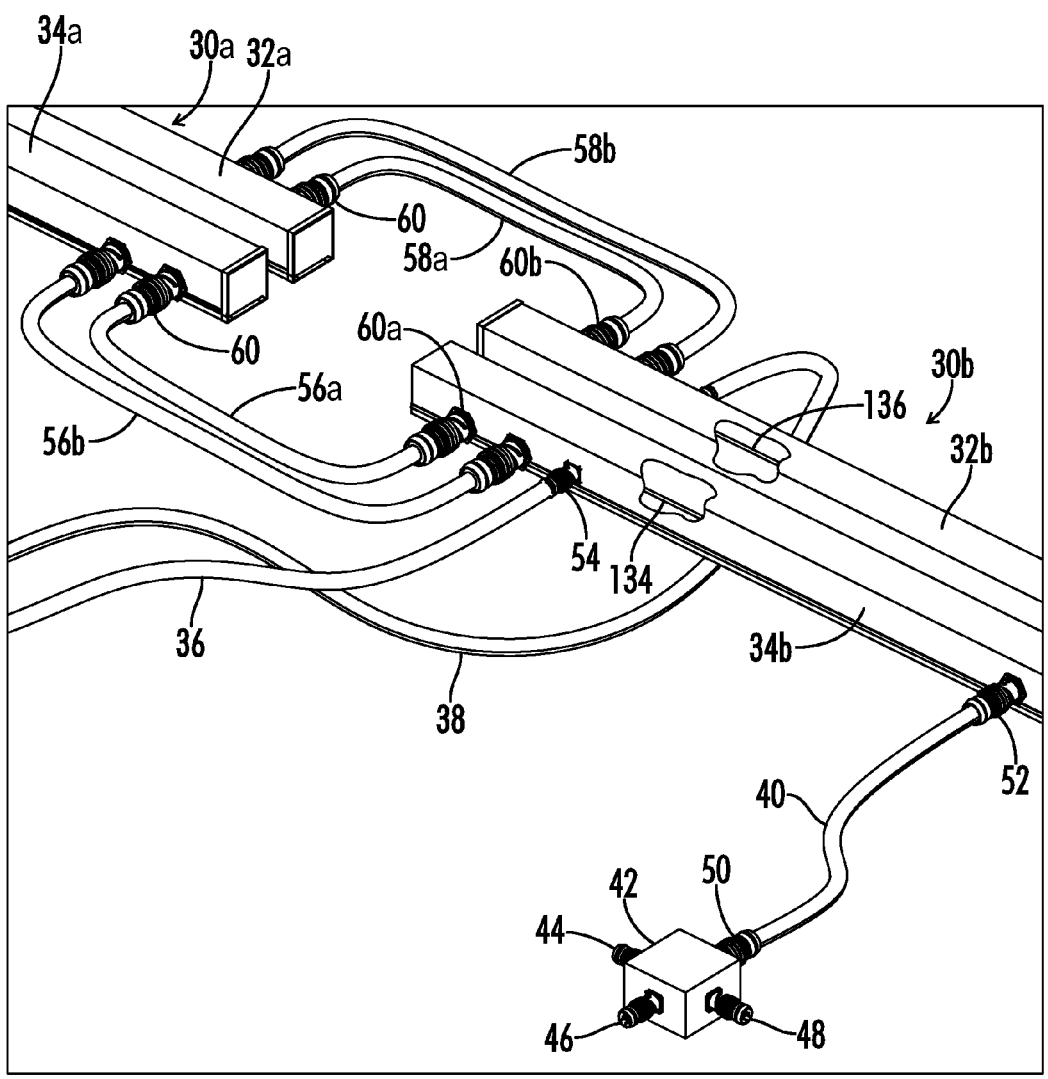
FIG. 3 illustrates a perspective view of an embodiment of an express raceway unit connected to a local raceway unit.

As seen in FIG. 1 and FIG. 3, in some embodiments, a first raceway 30a, or raceway unit, may be modularly connected to a second raceway 30b. In some embodiments first raceway 30a is referred to as an express raceway (or main raceway) and may be connected to a main electrical panel or main junction box. For example, as seen in FIG. 2, an express raceway 30a is connected to a normal power supply panel unit 106a and an independent emergency power supply panel unit 106b. In some embodiments, each express raceway 30a is designed to extend the circuits carried in the local raceway 30b to the independent circuit panels 90a, 90b in an electrical closet. These raceways are wired with #10AWG twisted strand or solid copper THNN conductors in some embodiments. No branch connector plugs are mounted on express raceways 30a in some embodiments. Each end of an express raceway 30a has up to 6 connector plugs, each with space for 24 #8 AWG or #10AWG conductors for a total of 168 conductors. Normal power express raceways 34a carry enough conductors to support 48 circuits and emergency power express raceways 32a carry enough conductors to support 36 circuits in some embodiments. Each raceway is also designed to be fed by a single panel 90a, 90b with 42 circuits in some embodiments.

Second raceway unit 30b is referred to as a local raceway in some embodiments because it is configured to provide an electrical connection to a local structural feature such as a wall unit 10 or a plurality of wall units 10a, 10b, 10c, etc. in a room or rooms in a building.

Each raceway includes an aluminum or galvanized steel rectangular or square tube ranging from 20 feet to 60 feet in length and has inner dimension ranging from 2×2 inches to 6×6 inches in some embodiments. A hinged or removable cover plate covers one side of the tube, and fixed or removable cover plates are installed at each end of the tube.

First raceway unit 30a includes two primary channels, or tracks. A first normal power track 34a is disposed on first raceway unit 30a. First normal power track 34a is a metal channel tube or elongated box in some embodiments. Electrical wires may be routed through the hollow interior of each raceway track. In some embodiments, the electrical wires extending inside each raceway track include #12 AWG or #10 AWG THNN multi-strand or solid copper wire conductor. A first emergency power track 32a is disposed on first raceway unit 30a beside first normal power track 34a. First emergency power track 32a also includes a similar structure including a metal channel tube or an elongated metal box. In some embodiments, each raceway track includes a substantially rectangular cross-sectional profile having dimensions of about four inches by four inches. In other embodiments, the size of each track may increase or decrease depending on the application.

Each emergency power track 32 may be connected to an independent power supply, such as a generator bank, for providing backup electrical power to one or more wall units 10 or other electrical modules in the event that power is lost to a normal power track 32.

Electrical wires are also disposed in the hollow interior of each raceway track. First normal power track 34a may be referred to as an express normal track, and first emergency power track 32a may be referred to as an express emergency track in some embodiments. The electrical wires disposed in each raceway track provide electrical current to modular components such as wall units 10 connected to one or more raceway units 30a, 30b, 30c, etc.

Each pin on the electrical connector plugs is identified with a number or a letter. A wiring diagram that shows the relationship of the pins of the entry connector plug to the pins of the branch connectors in the local raceway and to the pins of the exit connector plug in the express raceway is engraved on a mounting plate on the surface of each end of the raceway and at each branch connector plug 52 on the side of the raceway. At the time of manufacture, the raceway may be labeled with the name and location of the electrical panel that supplies its circuits, and the number of the circuit on that panel. The name of the panel and the circuits that each set of pins correspond to on the entry connector for local raceways, and for both the entry and exit connectors for express raceways, is engraved on a mounting plate which is affixed to the end(s) of the raceways, and at the location of each circuit branch connector plug 52 along the sides of the raceway.

Figure 6:
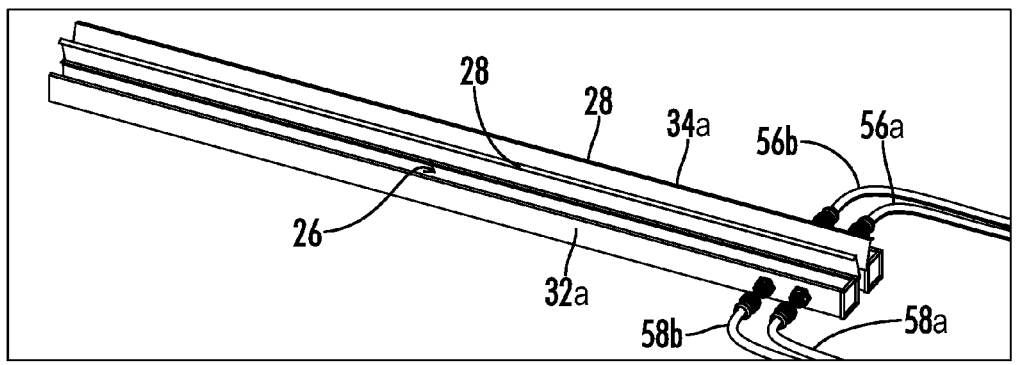
FIG. 6 illustrates a perspective view of an embodiment of a raceway unit.
Figure 7:
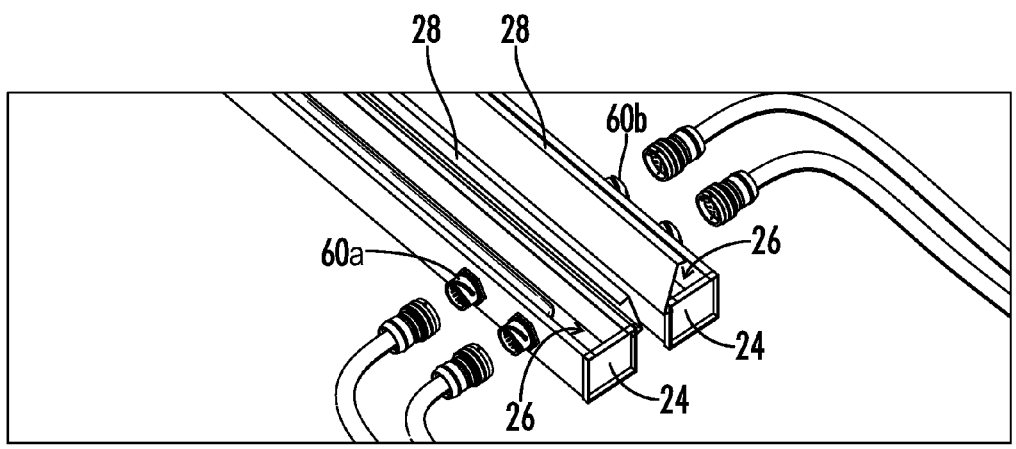
FIG. 7 illustrates a detail perspective view of the embodiment of a raceway unit of FIG. 6 showing connector plugs.
Figure 8A:
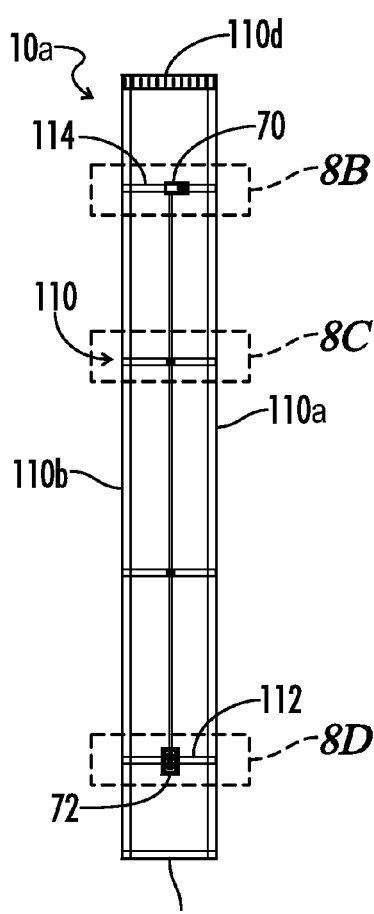
FIG. 8A illustrates a perspective view of an embodiment of a modular wall panel unit with an electrical power outlet pre-installed thereon.
Figure 8B:
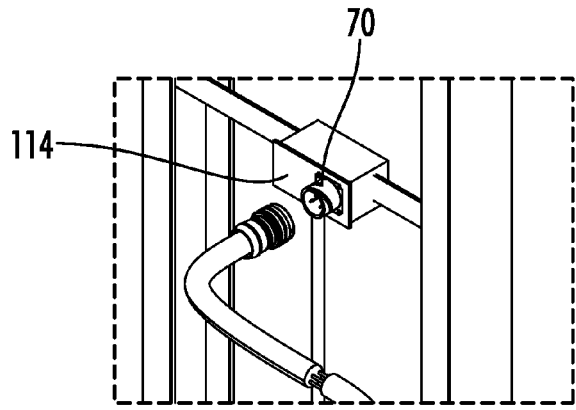
FIG. 8B illustrates a detail perspective view of an embodiment of a modular wall panel unit with an electrical power outlet pre-installed thereon.
Figure 8C:
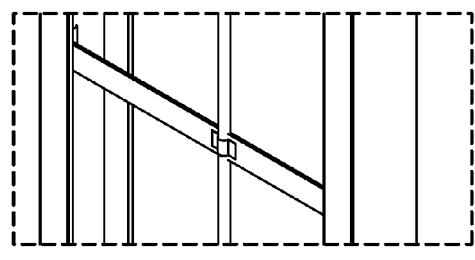
FIG. 8C illustrates a detail perspective view of an embodiment of a modular wall panel unit with an electrical power outlet pre-installed thereon.
Figure 8D:
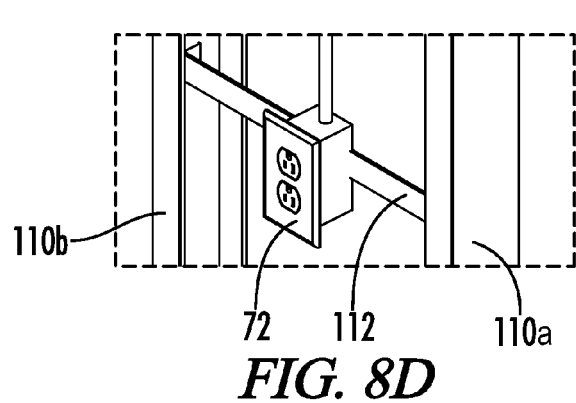
FIG. 8D illustrates a detail perspective view of an embodiment of a modular wall panel unit with an electrical power outlet pre-installed thereon.
Figure 9A:
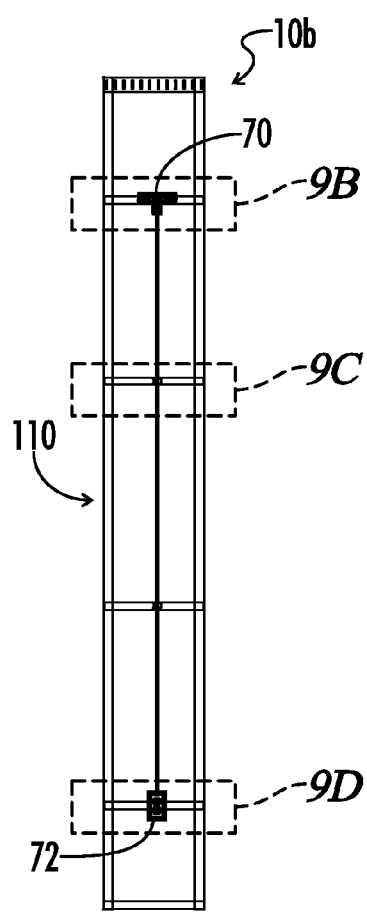
FIG. 9A illustrates a perspective view of an alternative embodiment of a modular wall panel unit.
Figure 9B:
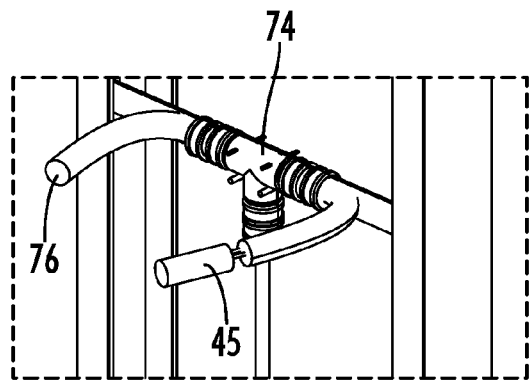
FIG. 9B illustrates a detail perspective view of an alternative embodiment of a modular wall panel unit.
Figure 9C:
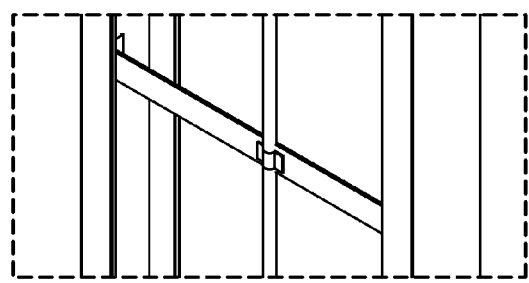
FIG. 9C illustrates a detail perspective view of an alternative embodiment of a modular wall panel unit.
Figure 9D:
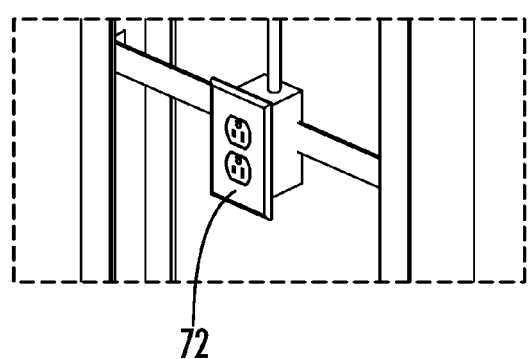
FIG. 9D illustrates a detail perspective view of an alternative embodiment of a modular wall panel unit.
Figure 10A:
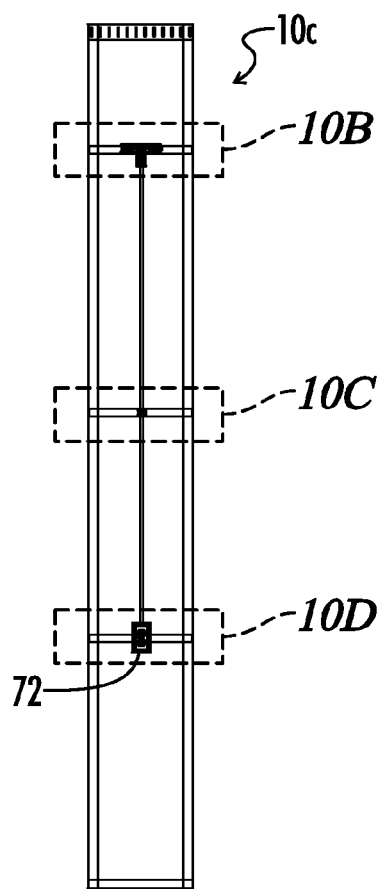
FIG. 10A illustrates a perspective view of an alternative embodiment of a modular wall panel unit.
Figure 10B:
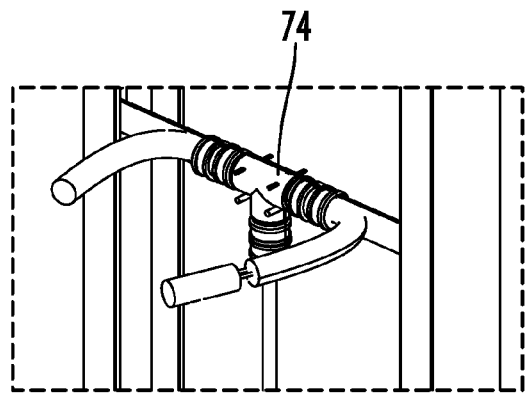
FIG. 10B illustrates a detail perspective view of an alternative embodiment of a modular wall panel unit.
Figure 10C:
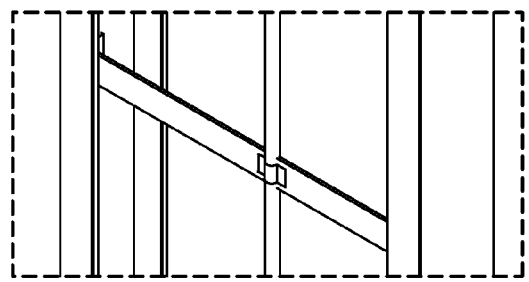
FIG. 10C illustrates a detail perspective view of an alternative embodiment of a modular wall panel unit.
Figure 10D:
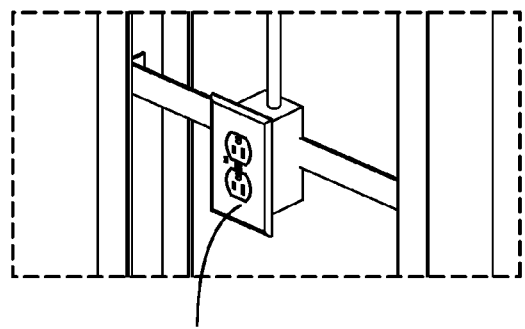
FIG. 10D illustrates a detail perspective view of an alternative embodiment of a modular wall panel unit.
Figure 11A:
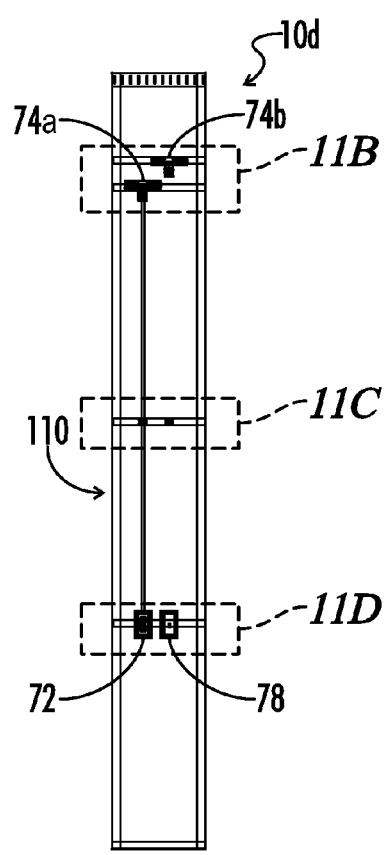
FIG. 11A illustrates a perspective view of an alternative embodiment of a modular wall panel unit.
Figure 11B:
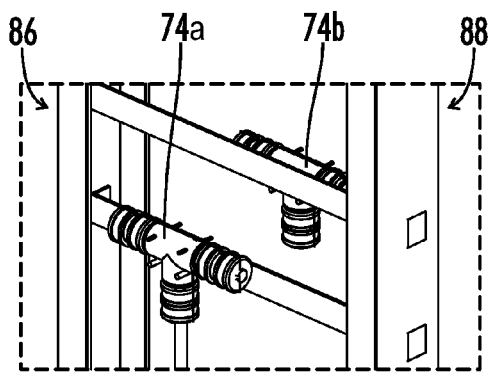
FIG. 11B illustrates a detail perspective view of an alternative embodiment of a modular wall panel unit.
Figure 11C:
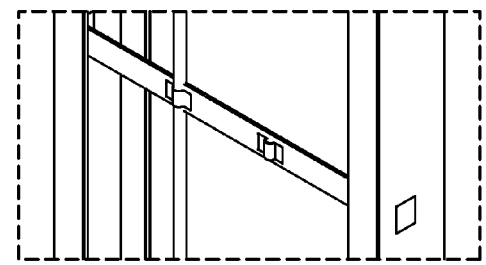
FIG. 11C illustrates a detail perspective view of an alternative embodiment of a modular wall panel unit.
Figure 11D:
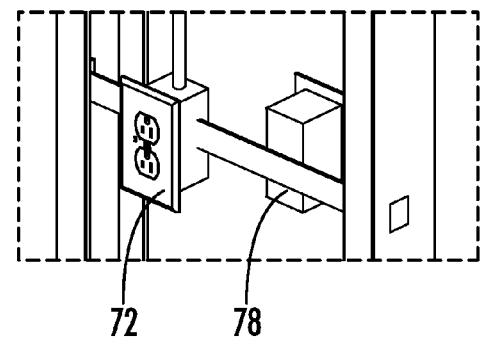
FIG. 11D illustrates a detail perspective view of an alternative embodiment of a modular wall panel unit.
Figure 12A:
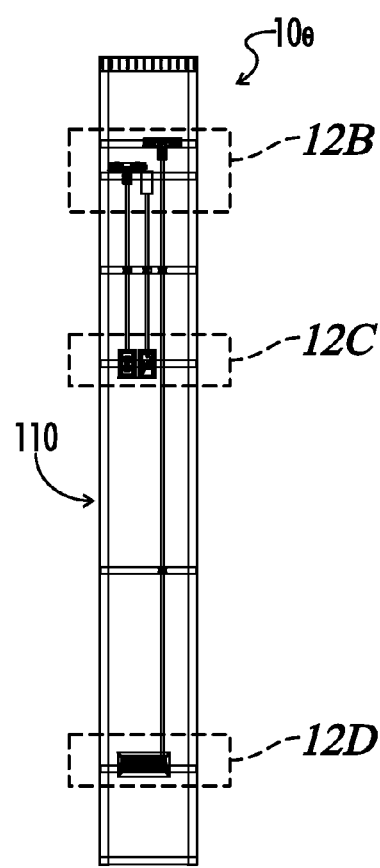
FIG. 12A illustrates a perspective view of an alternative embodiment of a modular wall panel unit.
Figure 12B:
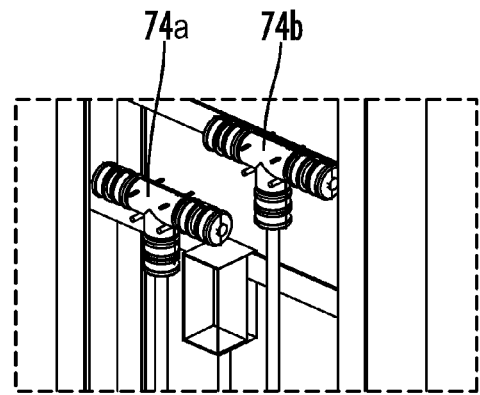
FIG. 12B illustrates a detail perspective view of an alternative embodiment of a modular wall panel unit.
Figure 12C:
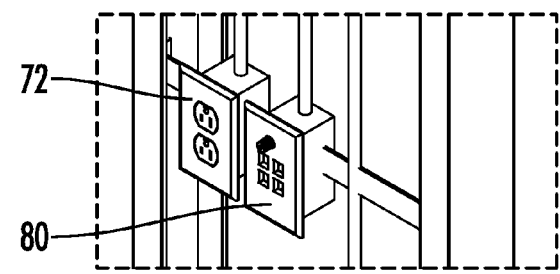
FIG. 12C illustrates a detail perspective view of an alternative embodiment of a modular wall panel unit.
Figure 12D:
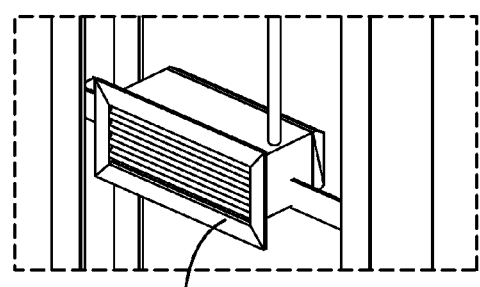
FIG. 12D illustrates a detail perspective view of an alternative embodiment of a modular wall panel unit.
Figure 13A:
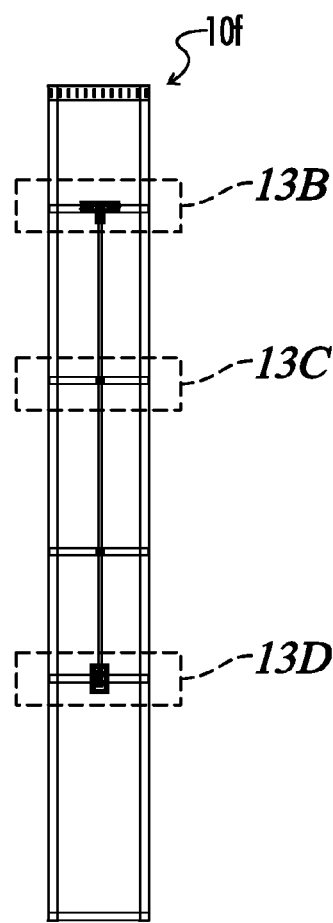
FIG. 13A illustrates a perspective view of an alternative embodiment of a modular wall panel unit.
Figure 13B:
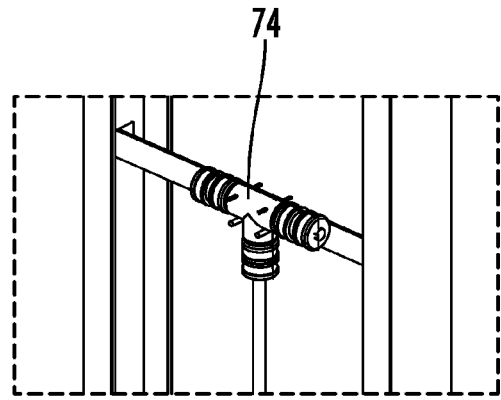
FIG. 13B illustrates a detail perspective view of an alternative embodiment of a modular wall panel unit.
Figure 13C:
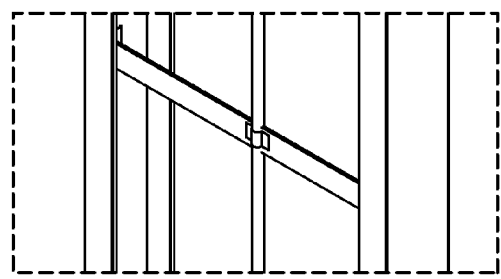
FIG. 13C illustrates a detail perspective view of an alternative embodiment of a modular wall panel unit.
Figure 13D:
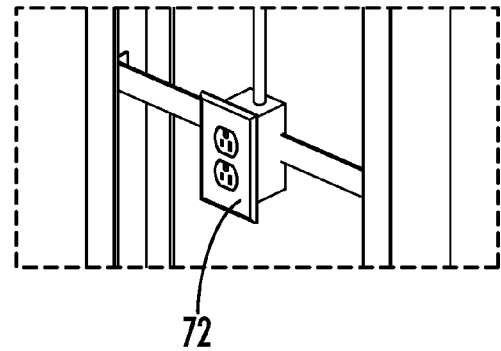
FIG. 13D illustrates a detail perspective view of an alternative embodiment of a modular wall panel unit.
Figure 14A:
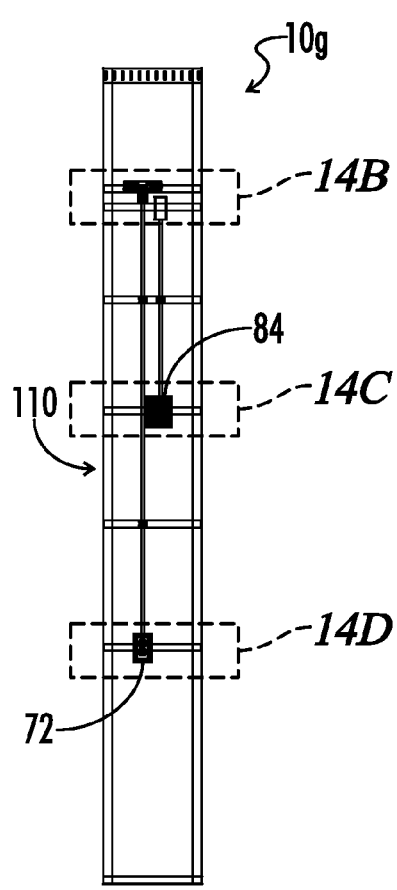
FIG. 14A illustrates a perspective view of an alternative embodiment of a modular wall panel unit.
Figure 14B:
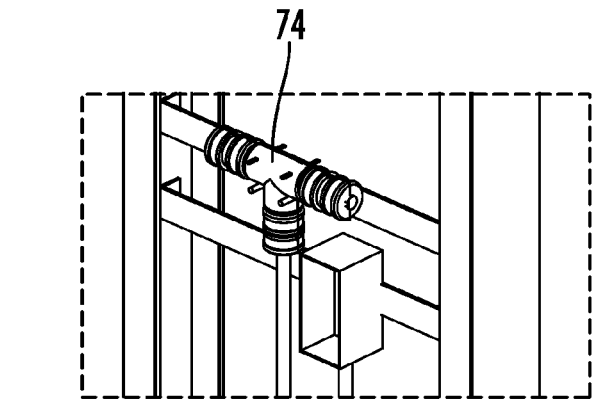
FIG. 14B illustrates a detail perspective view of an alternative embodiment of a modular wall panel unit.
Figure 14C:
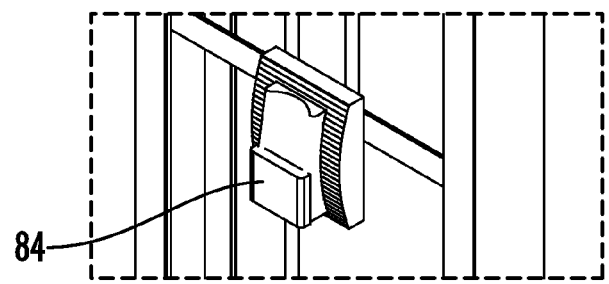
FIG. 14C illustrates a detail perspective view of an alternative embodiment of a modular wall panel unit.
Figure 14D:
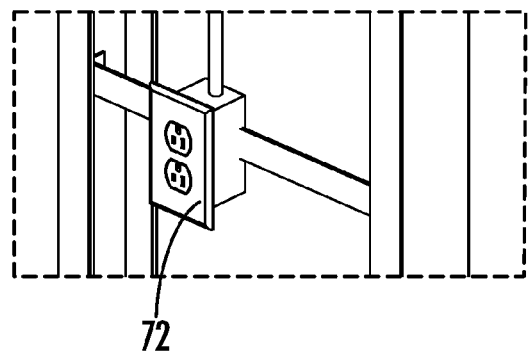
FIG. 14D illustrates a detail perspective view of an alternative embodiment of a modular wall panel unit.
Figure 15A:
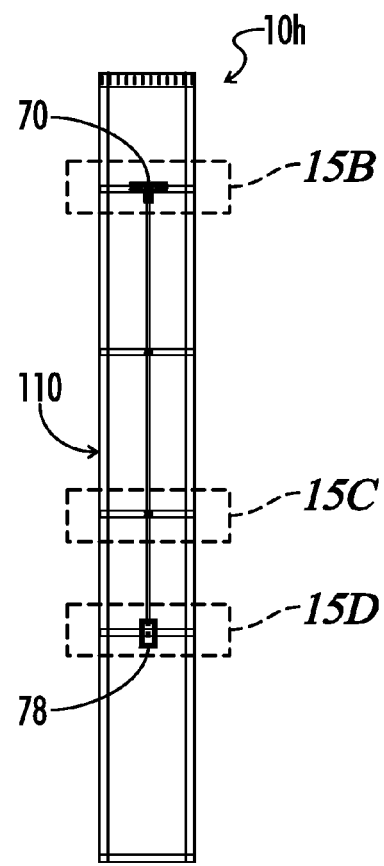
FIG. 15A illustrates a perspective view of an alternative embodiment of a modular wall panel unit.
Figure 15B:
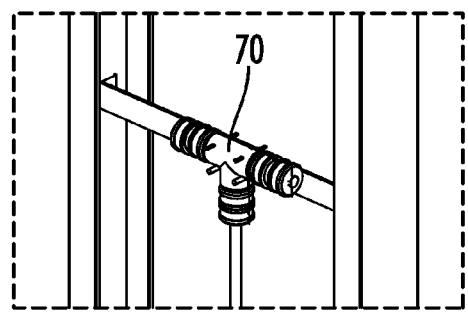
FIG. 15B illustrates a detail perspective view of an alternative embodiment of a modular wall panel unit.
Figure 15C:
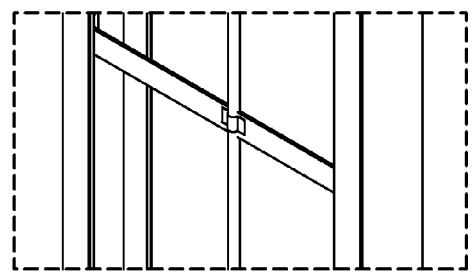
FIG. 15C illustrates a detail perspective view of an alternative embodiment of a modular wall panel unit.
Figure 15D:
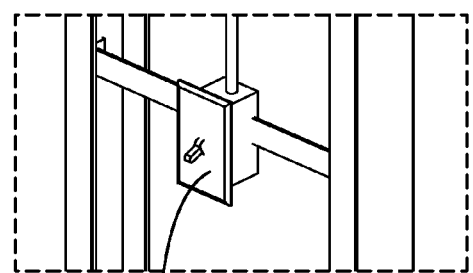
FIG. 15D illustrates a detail perspective view of an alternative embodiment of a modular wall panel unit.
Figure 16A:
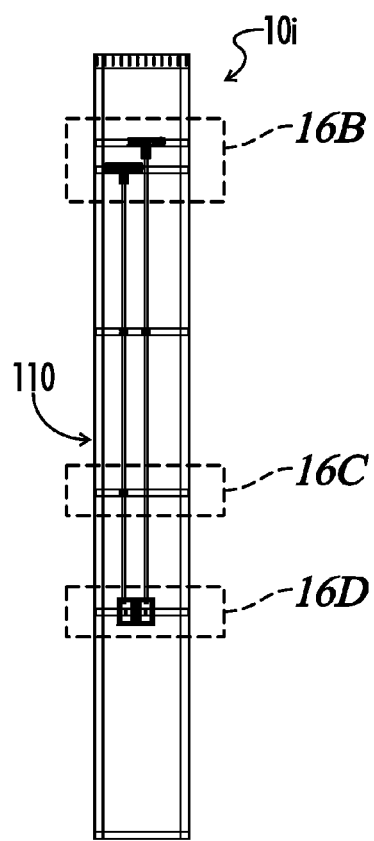
FIG. 16A illustrates a perspective view of an alternative embodiment of a modular wall panel unit.
Figure 16B:
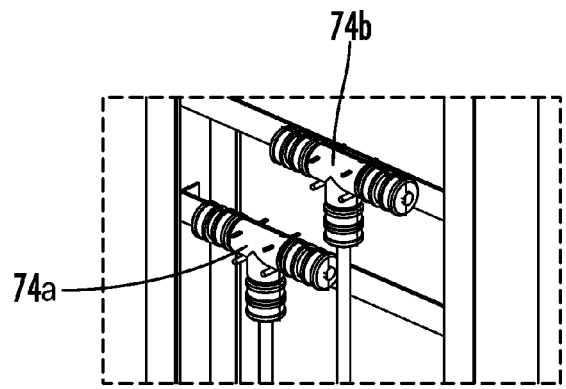
FIG. 16B illustrates a detail perspective view of an alternative embodiment of a modular wall panel unit.
Figure 16C:
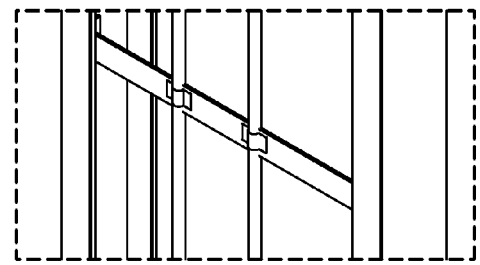
FIG. 16C illustrates a detail perspective view of an alternative embodiment of a modular wall panel unit.
Figure 16D:
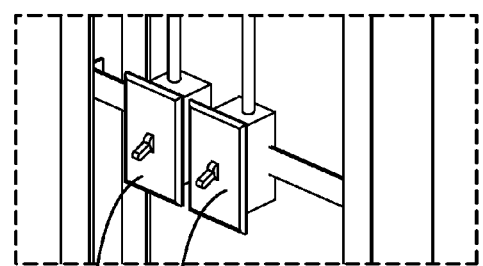
FIG. 16D illustrates a detail perspective view of an alternative embodiment of a modular wall panel unit.

Referring again to FIG. 1 and FIG. 3, an express raceway 30a is modularly connected to a local raceway 30b using a plurality of link cables. A first normal power link cable 56a connects a main normal power raceway 34a to a local normal power raceway 34b. First normal power link cable 56a includes a multi-strand conductive wire in some embodiments. A plurality of raceway connectors, or electrical raceway connector plugs 60, are disposed on each raceway to provide modular plug-and-play functionality, as seen in FIGS. 3, 6 and 7. In some embodiments, each raceway connector plug includes a male or female Amphenol multi-pin circular connector. Each normal power link cable 56 and emergency power link cable 58 also includes a corresponding male or female Amphenol multi-pin circular connector in some embodiments. During installation, a worker may simply mechanically attach a raceway at a desired location and then interconnect adjacent raceways using normal power link cables 56 and emergency power link cables 58. In some embodiments, a second normal power link cable 56b is also used to connect main normal power raceway 34a to local normal power raceway 34b. The second link cable may be necessary where a standardized cable or plug connector is desired. For example, in some embodiments, first normal power link cable 56a includes a 24-pin configuration. Second normal power link cable 56b also includes a 24-pin configuration. In various other embodiments, additional normal power link cables 56 and emergency power link cables 58 may also be used to provide additional electrical pathways from main raceway to local raceway.

Also seen in FIG. 6 and FIG. 7, in some embodiments, each raceway track includes a U-shaped channel having a cover 28. Cover 28 may be selectively removed for accessing a channel 26 defined in each raceway track for providing connections to each raceway connector plug 60. Additionally, each raceway track includes an end cap 24 for blocking, or sealing, the channel 26 at an axial end.

Each normal raceway track 32 includes a first exterior color, and each emergency raceway track includes a second exterior color, wherein the first and second exterior colors are not the same, in some embodiments. In such embodiments, an installer will be able to immediately identify which raceway track is an emergency power track, and which is a normal power track, thereby making installation more efficient and accurate. In some embodiments, each normal power track exterior color is yellow, and each emergency power track exterior color is orange or red.

Referring further to FIG. 1 and FIG. 3, in some embodiments, an express emergency power track 32a is connected to a local emergency power track 32b by one or more emergency power track link cables 58a, 58b.

Figure 4:
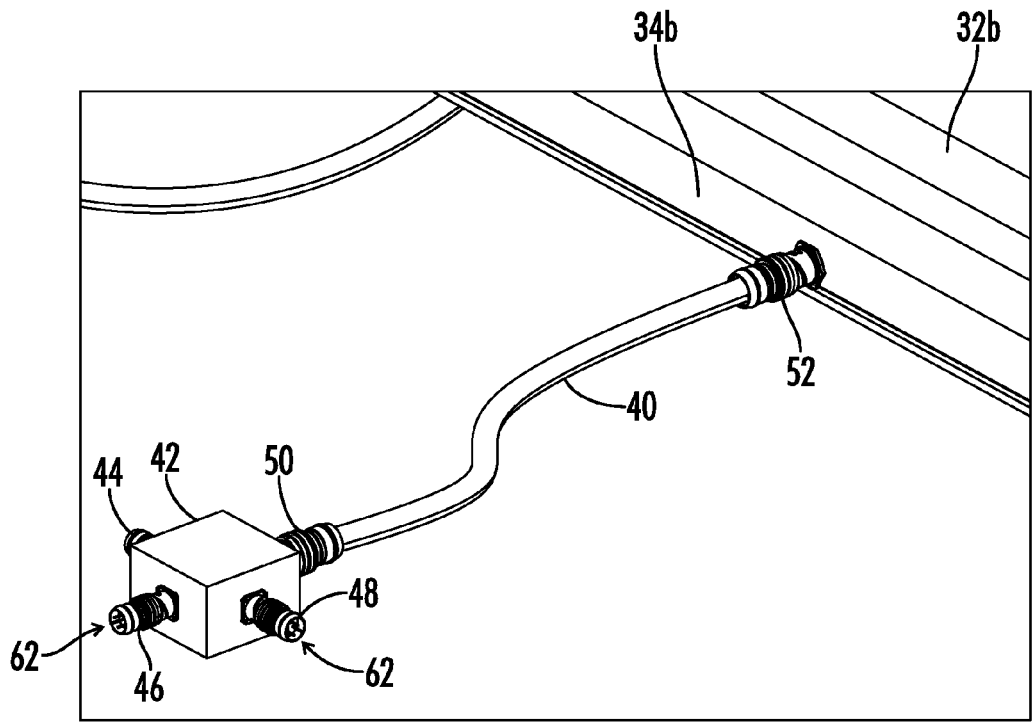
FIG. 4 illustrates a perspective view of an embodiment of a junction box attached to a local raceway unit via a branch circuit cable.

Also seen in FIG. 3 and FIG. 4, a branch circuit connector 40 may be detachably secured to a normal or emergency local raceway track. Branch circuit connector 40 connects to its corresponding raceway track at a branch connector plug 52, which includes a 24- or 48-pin circular connector in some embodiments. Other suitable types of multi-pin electrical connectors known in the art may also be used. Branch connector 40 is connected at one end to a raceway track and at the opposite end to a junction box 42.

Figure 5:
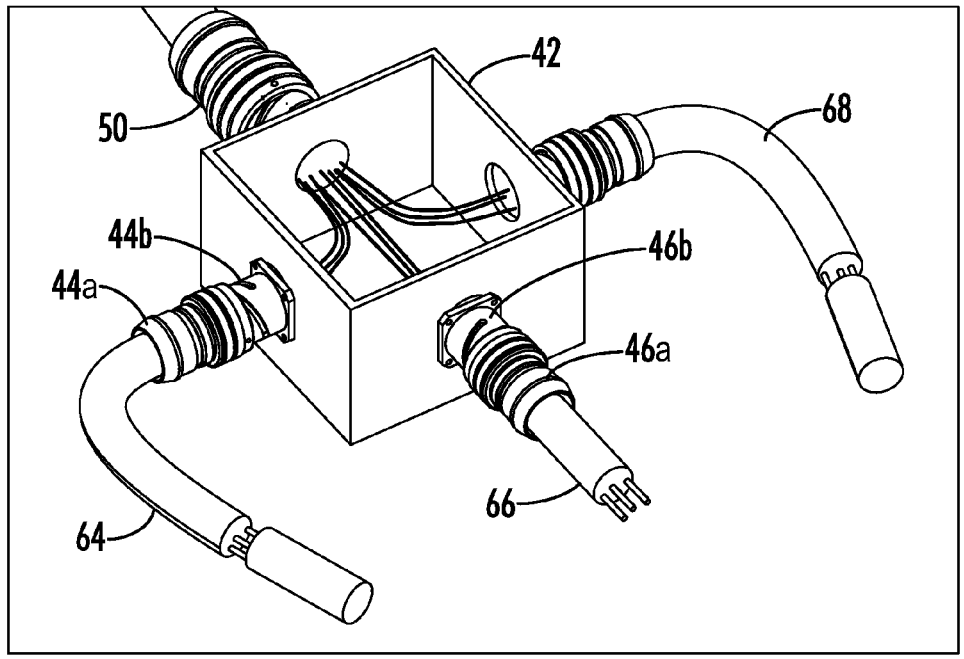
FIG. 5 illustrates a detail perspective view of an embodiment of a junction box.

Junction box 42, as seen in more detail in FIG. 5, includes a plug connector for engaging a corresponding plug on branch connector 40 and a hollow housing through which various connectors are routed. In some embodiments, junction box 42 includes first, second and third junctions 44, 46, 48 disposed thereon. Each junction includes a connector plug for connection to a modular building component such as a wall unit 10. In some embodiments, each junction on junction box 42 includes a multi-pin circular female connector plug.

Junction box 42 in some embodiments includes a 6"×6"×4" (Depth) UL listed galvanized steel junction box intended to receive power from a 12-pin branch circuit connector 40 carrying four normal power circuits and split them into smaller connectors mounted in the junction box for carrying one or more of those circuits to different destinations in the room. Normal power In-Room junction boxes have one 12-pin circular connector to receive power from a Normal Power Local Raceway branch connector, and four 3-Pin circular connectors to deliver power to Universal Wall System Panels, Universal Headwalls, and Universal Light Switch Panels, each of which have 3-pin connectors designed to receive power from the In-Room Junction box in some embodiments.

In some additional embodiments, an in-room junction box harness may be used without a plug connector between the junction box and the wall or ceiling mounted electrical device it is delivering power to. The junction box harness includes a 6"×6"×4" (Depth) UL listed galvanized steel junction box intended to receive power from a 12-pin branch circuit connector 40 carrying four normal power circuits and split them into four separate circuits in HCFC armored flex cable with three conductors each, the opposite end of each of which are wired to one or more duplex outlets or lighting circuit switches or dimmers.

As seen in FIG. 1, a plurality of junction cables 45, 47, 49 are connected to junction box 42 for distributing power to individual local wall panel units 10. Each junction cable includes a 3-wire electrical connection including positive voltage, return voltage and ground in some embodiments. During construction, wall panel units 10 may be installed on floor 18 at desired locations, raceway units 30 can be installed overhead at the desired locations, and then junction cables 45, 47, 49, etc. can be installed to provide an electrical connection between various electrical hardware items disposed on wall panel units 10 and the building electrical system.

Each local raceway 30b comes in multiple configurations which can be ordered by an end-user by specifying the length of the raceway, and the number of individual rooms the raceway is intended to feed, the distance between the rooms, and then number of circuits for each room. Each local raceway 30b can also be ordered in a standard configuration providing up to 4 branch circuits per room for normal power raceways, and 2 or 3 branch circuits per room for emergency and life safety power raceways. Normal power raceways are wired with two hot and one neutral conductor (red, black, white) for each circuit; Critical branch and life safety power raceways are wired with two hot, one neutral, and one ground (red, black, white, green) for each circuit. The normal branch local raceways are fitted with two circular connectors at the beginning of the raceway where the number of pins in the connector equals: (i) the number of rooms to be served multiplied by (ii) four which is the number of normal branch circuits per room multiplied by (iii) three which is the number of conductors per circuit. A raceway designed to serve four rooms will have two end connectors, each with 24 pins being utilized. Each of the side mounted connectors along the length of the raceway will have 12 pins. The first of the two end connectors will feed the first two side mounted connectors. The second of the two end connectors will feed the last two side mounted connectors. The connector pin configurations are different from the configurations used for critical branch, life safety, or equipment branch circuits. Lighting circuits are carried with 4-pin connectors on the side of the raceway and 12-pin connectors at the ends of the raceway. This prevents an end-user from connecting critical power to normal circuits, or vice versa.

The critical branch and life safety (emergency) raceway tracks 32a, 32b, etc. are fitted with two circular connector plugs at the beginning of a local raceway where the number of pins in the connector equals: (i) the number of rooms to be served multiplied by (ii) two or three which is the number of critical and/or life safety branch circuits per room multiplied by (iii) four which is the number of conductors per circuit. A raceway designed to serve four rooms will have two end connector plugs, each with 16- or 24-pins being utilized (for the two or three circuit per room model, respectively). Each of the side mounted branch connector plugs along the length of the raceway will have 12-pins. The first of the two end connector plugs will feed the first two side mounted connector plugs. The second of the two end connector plugs will feed the last two side mounted connector plugs. The connector pin configurations are different from the configurations used for critical branch, life safety, or equipment branch circuits. Lighting circuits are carried with 4-pin connector plugs on the side of the raceway and 12-pin connector plugs at the ends of the raceway. This prevents an end-user from connecting critical power to normal circuits, or vice versa.

The raceway is generally to be positioned in an area above the ceiling that minimizes the distance between the branch circuit connectors for the room, and is not in a location that would conflict with other services in the room (e.g. plumbing, medical gas, HVAC, and lighting). During the construction or renovation of the building a framed opening is created in the wall above the ceiling for passage of the raceway(s) from one room to another in the area which has been designated for the raceway to pass over the ceiling. The framed opening is designed to be the nominal dimensions of the square or rectangular tube plus ½" on each side of the tube to allow passage of the raceway through the opening and allow clearance of protruding branch circuit connectors during installation. The raceway is designed to pass through rooms that occupy up to a 60' length. The raceway is supported by the metal stud framing of the walls through which it passes, and by hangers supported by the deck above at intervals of 10' between the walls supporting the raceway. The raceway is strapped to the steel studs surrounding it in the framed wall opening. Following strapping the wall section is covered with gypsum board to occlude any opening in the area through which the raceway is passing. The opening is caulked with an approved fire-stop material to achieve the fire rating required of the wall.

Following the positioning of the raceway, the branch circuit connectors are joined to the electrical devices in the room, either through wiring to one or more junction boxes, or to circuits which are terminated into a mating receptacle with the branch circuit connector. This type of mating is achieved with a multi-conductor cable which has a male connector on the end that will be connected with the raceway connector plug, and a female end on the side which will be connected with in-room electrical device(s). The pin configuration of the connectors is unique to the type of circuit to prevent connecting an electrical device to the wrong type of power supply. The connecting conductors may be in HCFC flexible conduit (UL and Hospital Grade) of up to 5' in length, or protected in custom cut lengths of EMT conduit which are attached to the connectors at each end with a compression fitting that is UL approved for the connector.

Express raceways 30a may be connected with another raceway at either or both ends, or may be connected with the distribution panel 90 in the electrical room at one end, and either the proximal end of another express raceway at the distal end, or a local raceway 30b at the distal end.

The disclosure also includes a wiring trough that serves as the 'middle ware' between the raceways and the panel board in the electrical closet. This part of the invention is a wiring trough with one or more circular connectors, each of which is wired to the circuit panel above or beneath it. Each circular connector plug is wired to one or more circuits in the panel board. The number of connector in the trough is determined by the number of circuits that are feeding the raceway system, such that each normal circuit is terminated on three pins, and each emergency or life safety circuit is terminated on four pins of the connector(s). Connection of the raceway at the panel (proximal) end is made into a wiring trough that is pre-fitted with female connectors corresponding to the circular connectors at the proximal end of the raceway, and which in turn, is wired in the wiring trough to the relevant circuit breakers in the electrical panel. Each connector plug on the wiring trough is labeled with the circuit number in the panel to which it is wired, clearly showing which pins on the circular connector correspond to the circuit number on the panel board. All raceways between the wiring trough and the local branch circuit are identified on permanently affixed mounting plates on each raceway entrance and exit for that circuit, and on the final raceway or conduit leading to the electrical device, and the electrical device faceplate itself.

The raceways are wired in a factory environment in accordance with the wiring diagram for that raceway. The raceway is assigned a unique serial number which is displayed in a permanent bar code label on each face of the raceway at each end and at each branch circuit connector plug location on the sides of the raceway (if a local raceway). The assigned barcode number is stored in a database with the wiring diagram for that particular raceway which includes the serial number and part number of each connector installed in the raceway, the pin numbers of each pair of connectors that are wired together with conductor inside the raceway, and the panel name and circuit number corresponding to the connectors in the electrical closet. The database also includes the name of the person(s) responsible for fabrication of the raceway, including the wiring and pin connections. The raceway is tested for impedance and voltage drop by making a connection with the entry connector and each of its termination connectors using a volt-meter and ammeter connected on each end through a device which requires continuity of each and every conductor of the connectors on each end of the test circuit. A digital reading from the testing devices is captured and stored in the database with the identification name and number of the individual performing the test. A certification label is then affixed to the raceway on each face of the raceway at each end and at each branch circuit connector location on the sides of the raceway (if a local raceway).

Referring now to FIG. 1 and FIGS. 8A-16D, various embodiments of universal wall system panels, or modular wall panel units 10a-10i, are illustrated. Each modular wall panel unit 10 includes a frame 110 with one or more pre-assembled hardware components that can be installed as part of a building structure. Although numerous embodiments of possible wall panel units are illustrated, the embodiments disclosed herein are not exhaustive of all possible hardware combinations and are provided only as examples.

Referring to FIGS. 8A-8D, in some embodiments, the present disclosure provides a prewired building wall panel apparatus 10 for modular installation in a wall of a building. The wall panel apparatus 10 includes a modular frame 110 having first and second upright stud members 110a, 110b. Each upright stud member 110a, 110b may include a vertical orientation and include a steel framing stud. A base stud member 110c spans the first and second upright stud members 110a, 110b at the base of the panel 10. An upper frame member 110d spans the first and second upright stud members 110a, 110b at a location above the base stud member 110c. The frame 110 is generally shaped to form an integral portion of the wall. A first bracket 112 spans the upright stud members 110a, 110b at a location between the base stud 110c and the upper frame member 110d. An electrical component, such as an electrical power outlet 72, is installed on the first bracket 112. A second bracket 114 spans the upright stud members at a location between the first bracket 112 and the upper frame member 110d. An electrical connector plug 70 is disposed on the second bracket 114. The electrical connector plug 70 is prewired to the electrical component prior to installation of the panel apparatus in a wall of a building.

In some embodiments, each wall panel apparatus 10 includes a section of steel stud wall that is pre-fabricated to include one or more vertical EMT conduits and/or HCFC armored flex cables which are terminated at one end in hospital grade duplex outlets, and at the other end in a circular connector which is either 3 pins for normal power, or 4 pins for critical branch power, and which connectors are mounted in 2"×4"×2" junction boxes, each of which are mounted to the steel stud wall at a location that will correspond to a height of 10'-6" above the finished floor when this pre-fabricated section of steel stud wall is mounted in a framed opening in the steel stud wall in the room where the electrical outlets will be located. The outer dimensions of the modular wall panel are between 11'-0" and the height of the roof deck less ½"×14¾", and the modular wall panel is designed to be installed in an opening in the steel stud wall in the room measuring 15" in width. The modular is constructed of 3⅝" deep 20 gauge galvanized steel or galvalum studs. The modular wall panels are installed in the opening and secured to the surrounding stud walls, the floor deck, and the roof (or upper floor) deck with fasteners. The top channel of the modular wall panel is a UL-Listed slotted deflection channel with a 1" high slot dimension. The overall height of the modular wall panel is designed to be ½" shorter than the height from the floor deck to the bottom of the roof deck to which it will be attached. The slotted deflection channel will be used to adjust the final dimension of the height of the Universal Wall System so it is securely fastened to the roof deck at the time of installation. The top bar, or channel, includes a plurality of vertical clearance slots for adjusting the height of an attachment member for mounting the panel. By providing slots, variation in the local vertical mounting space between floor and ceiling can be accommodated during installation. This can be seen in FIGS. 8A-13A showing the slotted track at the top of the wall section. The circular connector plugs are mated with the closest power side connector of the same configuration (3 pin or 4 pin) in the room using a multi-conductor cable which has a male connector on the end that will be connected with the power raceway connector, and a female end on the side which will be connected with Universal Wall System Panel connector (which is located at 10'-6" above the finished floor). The pin configuration of the connectors is unique to the type of circuit to prevent connecting an electrical device to the wrong type of power supply. The connecting conductors may be in HCFC flexible conduit (UL and Hospital Grade) of up to 5' in length for Critical or Life Safety branch circuits, or protected in custom cut lengths of EMT conduit which are attached to the connectors at each end with a compression fitting that is UL approved for the connector. The connecting conductors may be in HCFC flexible conduit (UL and Hospital Grade) of up to 20' in length for normal power branch circuits, and supported from a structural element (e.g. the roof or floor deck above) at appropriate intervals based on the relevant building codes.

FIGS. 8A-8D illustrate a wall panel unit 10a including a single 3-pin panel electrical connector plug 70 for attachment to a junction cable 45 or to a series cable 76. As seen in FIG. 1, a series cable 76 may extend between one or more wall panel units 10 to provide an electrical connection among units. Wall panel unit 10a includes a terminal panel unit because it has only one electrical connector plug 70. An electrical power outlet 72 is pre-installed on modular wall panel unit 10 and is wired to electrical connector plug 70. In some embodiments, electrical power outlet 72 is elevated a standardized distance from the bottom of wall panel unit 10a to comply with one or more standardized building and/or electrical codes. FIGS. 13A-13D illustrate a similar embodiment of a wall panel unit 10f.

FIGS. 9A-9D illustrate an alternative embodiment of a wall panel unit 10b wherein electrical connector plug 70 is a tee connector 74 configured to receive both a junction cable 45 extending from a junction box 42 and a series cable 76 extending to another wall panel unit. An electrical component such as an electrical power outlet 72 is also pre-installed on the frame 110 of panel unit 10b and is prewired to electrical connector plug 70. FIGS. 10A-10D illustrate an additional embodiment of a wall panel unit 10c similar to wall panel unit 10b, but wherein power outlet 72 is raised a higher distance from the bottom of panel 10c and includes a ground fault interrupter (GFI) circuit.

In some embodiments, wall panel unit 10 includes electrical, mechanical or communications hardware on both sides of the panel for supporting connectivity in adjacent rooms of the building. For example, FIGS. 11A-11D illustrate an embodiment of a wall panel unit 10d including a frame 110 defining a first side 86 corresponding to a first room and a second side 88 corresponding to a second room. Wall panel unit 10d and frame 110 form part of the wall separating the two rooms. A first electrical connector plug such as a tee connector 74a is disposed on the first side of the panel unit, and a second electrical connector plug such as a tee connector 74b is disposed on the second side of the panel unit. Additionally, a first electrical component, such as an electrical power outlet 72 is installed on the first side of the panel unit and connected to first tee plug connector 74a, and a second electrical component, such as a light switch 78 is installed on the second side of panel unit. Installation of first electrical component on the first side 86 makes that component accessible from the first room. Installation of the second electrical component on the second side 88 makes that component accessible from the second room. First and second electrical components may include any suitable electrical component known in the art for a building room and are not limited to the specific items listed herein. By providing electrical hardware for adjacent rooms on a single, pre-fabricated wall panel unit 10d, considerable time and expense can be saved during a building construction.

In additional embodiments, more complex wall panel units including multiple electrical components can be prewired prior to installation in a building wall. As seen in FIGS. 12A-12D, an additional embodiment of a wall panel unit 10e includes first and second electrical connector plugs, such as first and second tee connectors 74a, 74b, mounted on frame 110. The first electrical connector plug is electrically prewired to an electrical component such as an electrical power outlet 72 also mounted on frame 110. The second electrical connector plug is electrically prewired to a different electrical component such as a night light 82.

In some embodiments, the electrical component mounted on frame 110 of modular wall panel apparatus 10 includes a television connector plug. In additional embodiments, the electrical component mounted frame 110 of modular all panel apparatus 10 includes a data connector plug 80. Data connector plug 80 is may be electrically prewired to a data box also installed on panel unit 10e before installation of the panel in a building.

As seen in FIGS. 14A-14D, an additional embodiment of a wall panel unit 10g including an electrical connector plug, such as a tee connector 74, and an electrical component mounted on the frame 110 such as a fire strobe light 84. Fire strobe light 84 may be electrically prewired to an electrical gang box, or alternatively, to an electrical connector plug such as a tee connector 74. A second electrical component such as an electrical power outlet 72 is also electrically prewired to tee connector 74 in some embodiments. Fire strobe light 84 may be configured to emit periodic flashes of light and/or an audible tone for alerting patients that a fire alarm has been activated. Fire strobe 84 may be attached to an independent fire alarm circuit via the electrical gang box installed on wall panel unit 10.

As seen in FIGS. 15A-15D, an additional embodiment of a wall panel unit 10h includes a tee connector 74 connected to pre-installed electrical component such as an electrical switch, or light switch 78. Light switch 78 is mounted on the frame 110. Light switch 78 is operable for controlling a lighting unit or another piece of electrical hardware connected to panel unit 10h. Light switch 78 is electrically prewired to electrical connector plug 70 in some embodiments.

Additionally, in some embodiments such as those illustrated in FIGS. 16A-16D, first and second electrical components such as first and second light switches 78a, 78b are pre-installed on panel unit 10i. Each light switch 78a, 78b is prewired to an electrical connector plug mounted on frame 110, such as first and second tee connectors 74a, 74b seen in FIG. 16B. In additional embodiments, wall panel units 10 may include other suitable plumbing or communications hardware pre-installed thereon for modular attachment to plumbing or communications systems within a building after installation of the wall panel unit.

Referring further to FIGS. 17A-17B, in some embodiments the electrical component mounted on frame 110 includes an electronic keypad 116. Electronic keypad 116 is prewired to an electrical connector plug 70 prior to installation of the wall panel unit 10 in a building in some embodiments.

Additionally, a prefabricated medical headwall apparatus 200, or headwall unit, seen in FIG. 1, may be modularly installed in a building. Headwall apparatus 200 may be attached to the electrical raceway system 102 of the present disclosure after installation of both the raceway 30 and the headwall 200 in a plug-and-play configuration. Headwall unit 200 includes a segment of wall that is intended for the area behind the patient's bed in a patient hospital room, an emergency department exam room, a procedure room, and a wall that is close to the X-ray table or stretcher in a hospital imaging room. Headwall unit 200 is designed to fit into a framed opening measuring 48"×9'-9" the bottom of which is located 12" above the finish floor in some embodiments. In other embodiments, headwall unit 200 may include other suitable dimensions for modular installation into a structural wall in a building.

In some embodiments, headwall unit 200 includes a modular headwall frame 111 including first and second upright stud members 110a, 110b. Each upright stud member 110a, 110b can include any conventional building stud. A base stud member 110c spans the first and second upright stud members near the lower end of the upright stud members, and an upper frame member 110d spans the first and second upright stud members above the base stud member 110c.

Headwall unit 200 includes a plurality of electrical and plumbing components configured to support machinery associated with caring for a patient. A first electrical power outlet 72a is mounted on the headwall frame 111. A second electrical power outlet 72b is also mounted on the headwall frame 111. In some embodiments, the first electrical power outlet 72a is a normal power electrical power outlet, and the second electrical power outlet 72b is an emergency power electrical power outlet. A first connector plug 70a is mounted on headwall frame 111 and electrically prewired to the first electrical power outlet 72a prior to installation of the headwall frame 111 in the building. The first connector plug 70a is configured for connection to a first power supply upon installation of the headwall frame 111 in the building. A second connector plug 70b is also mounted on headwall frame 111 and electrically prewired to the second electrical power outlet 72b prior to installation of headwall frame 111 in the building. The second connector plug 70b is configured for connection to a second power supply upon installation of headwall frame 111 in the building. In some embodiments, the first power supply is a normal power supply and the second power supply is an emergency power supply such as a generator or backup power grid.

A medical air outlet 126 is also mounted on headwall frame 111 in some embodiments. Medical air outlet 126 may include any suitable gas fitting for connecting one or more gas hoses. An oxygen outlet 128 is also mounted on headwall frame 111 in some embodiments. Oxygen outlet 128 also includes any suitable gas fitting for connecting one or more gas hoses. A vacuum inlet port 138 is also mounted on headwall frame 111. Vacuum inlet port 138 includes any suitable gas fitting for connecting one or more vacuum hoses.

In some embodiments, a hospital bed connector plug 140 is also mounted on headwall frame 111. Bed connector plug 140 can include any suitable connector for electrically connecting a hospital bed to headwall unit 200. In some embodiments, bed connector plug 140 includes a standard 37-pin hospital bed connector plug. A nurse call 142 is also mounted on headwall frame 111 in some embodiments. Nurse call 142 includes any suitable nurse call, such as an intercom for allowing a patient to remotely page and communicate with a nurse. A code blue indicator 144 is also mounted on headwall frame 111 in some embodiments. The code blue indicator 144 provides a visual indicator when a patient is in a code blue condition. Additionally, a fire strobe light 84 is mounted on the headwall frame in some embodiments. Each of the bed connector plug 140, nurse call 142, code blue indicator 144, and fire strobe light 84 is electrically prewired to a corresponding electrical connector plug on the headwall frame 111 prior to installation of the headwall frame in a building.

Figures 18A, 18B:
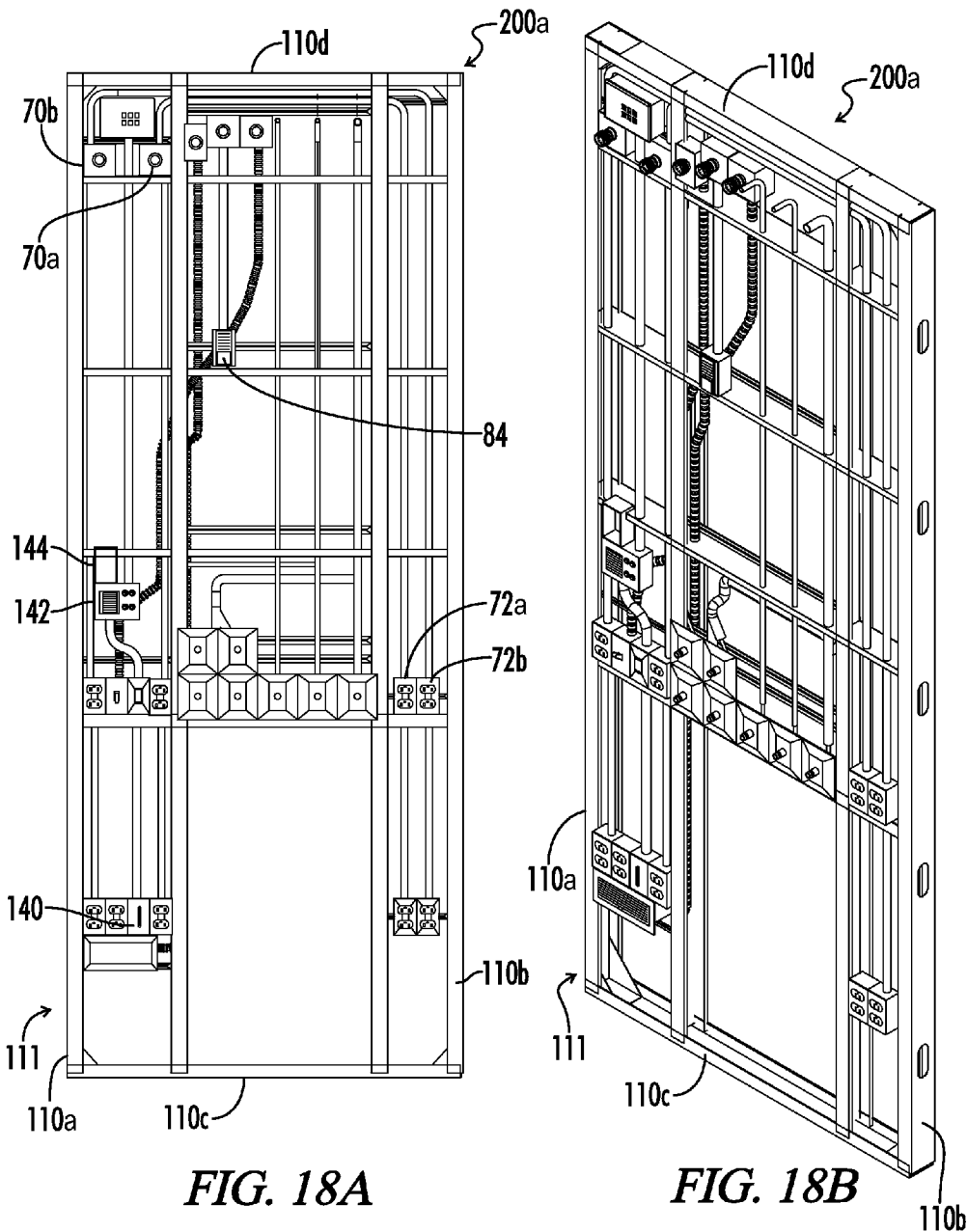
FIG. 18A illustrates front elevation view of an embodiment of a high acuity universal headwall apparatus.
FIG. 18B illustrates front perspective view of an embodiment of a high acuity universal headwall apparatus.
Figure 19A:
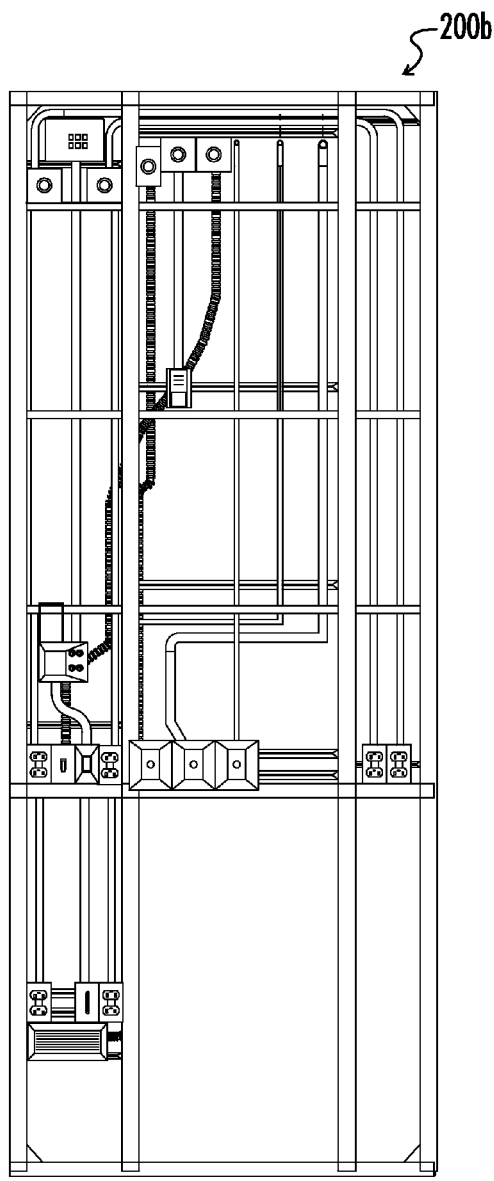
FIG. 19A illustrates front elevation view of an embodiment of a low acuity universal headwall apparatus.

In addition to these features, headwall unit 200 further includes one or more pipes pre-installed on headwall frame 111 prior to installation of headwall frame 111 in a building. For example, as seen in FIGS. 18A and 19A, a medical air outlet pipe 146 is mounted on headwall frame 111 between first and second upright stud members 110a, 110b. Medical air outlet pipe 111 has a first medical air outlet pipe end connected to the medical air outlet 126 and a second medical air outlet pipe end positioned for connection to a building medical air line after installation of the headwall panel in the building.

Referring further to FIG. 18A, a headwall unit 200 in some embodiments includes an oxygen outlet pipe 148 mounted on headwall frame 111 between first and second upright stud members 110a, 110b prior to installation of headwall frame 111 in a building. The oxygen outlet pipe 148 has a first oxygen outlet pipe end connected to oxygen outlet 128 and a second oxygen outlet pipe end positioned for connection to a building oxygen line after installation of the headwall panel in the building.

Also seen in FIG. 18A, in some embodiments, headwall unit 200 includes a vacuum inlet pipe 146 mounted on headwall frame 111 between first and second upright stud members 110a, 110b prior to installation of headwall frame in a building. Vacuum inlet pipe 146 includes a first vacuum inlet pipe end connected to the vacuum inlet and a second vacuum inlet pipe end positioned for connection to a building vacuum line after installation of headwall unit 200 in the building.

Headwall unit 200 includes a steel stud wall measuring (outer dimensions) between 11'-0" in some embodiments. Headwall unit 200 is constructed of 3⅝" deep 20 gauge galvanized steel or galvalum studs in some embodiments. The headwall unit 200 is installed in the framed opening and secured to the surrounding stud walls, sills, and headers with fasteners. A circular connector with 8 pins is located in a 4"×4"×2" j-box which is mounted to the underside of the steel stud running across the top of the headwall unit 200 in some embodiments. This connector is intended for providing Critical Branch power to 6 duplex Hospital Grade red colored outlets which are distributed on each side of the nominal area of the patient's bed or stretcher along the wall. This circular outlet carries two separate circuits of critical branch power, each fed by four conductors which are red, black, white, and green (the first two are 'hot', the white is neutral, and the green is ground). A circular connector with 3 pins is located in a 2"×4"×2" j-box which is mounted to the underside of the steel stud running across the top of the headwall unit 200 in some embodiments. This connector is intended for providing normal power to two duplex Hospital Grade ivory colored outlets which are distributed on each side of the nominal area of the patient's bed or stretcher along the wall, and for power to the switch and/or dimmer controls of an over bed light. This circular outlet carries one circuit of normal power, which is fed by three conductors which are red, black, and white, (the first two are 'hot' and the white is neutral). The circular connector(s) are mated with the closest power side connector of the same configuration (3-pin or 8-pin) in the room using a multi-conductor cable which has a male connector on the end that will be connected with the power raceway connector, and a female end on the side which will be connected with Universal Wall System Panel connector (which is located at 10'-6" above the finished floor. The pin configuration of the connectors is unique to the type of circuit to prevent connecting an electrical device to the wrong type of power supply. The connecting conductors may be in HCFC flexible conduit (UL and Hospital Grade) of up to 5' in length for Critical or Life Safety branch circuits, or protected in custom cut lengths of EMT conduit which are attached to the connectors at each end with a compression fitting that is UL approved for the connector. The connecting conductors may be in HCFC flexible conduit (UL and Hospital Grade) of up to 20' in length for normal power branch circuits, and supported from a structural element (e.g. the roof or floor deck above) at appropriate intervals based on the relevant building codes.

Figure 19B:
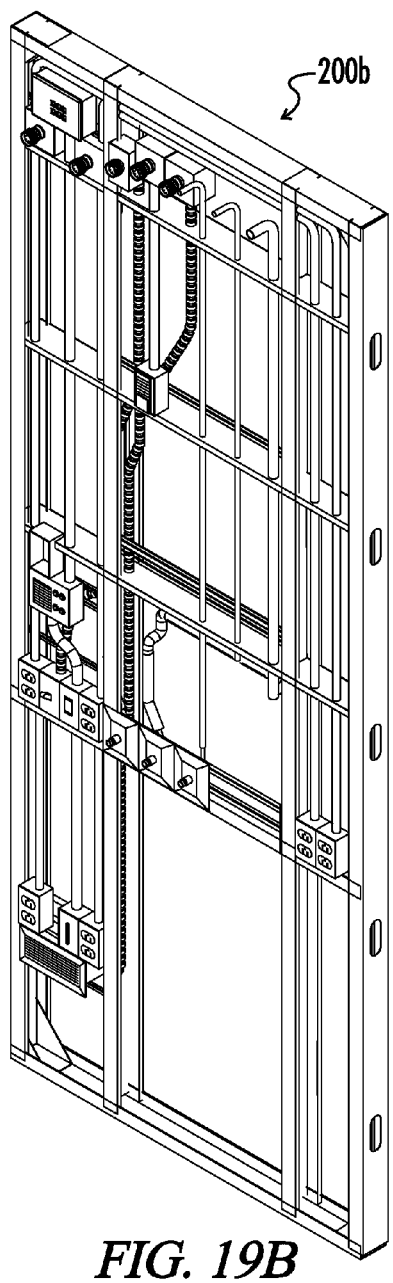
FIG. 19B illustrates front perspective view of an embodiment of a low acuity universal headwall apparatus.
Figure 20A:
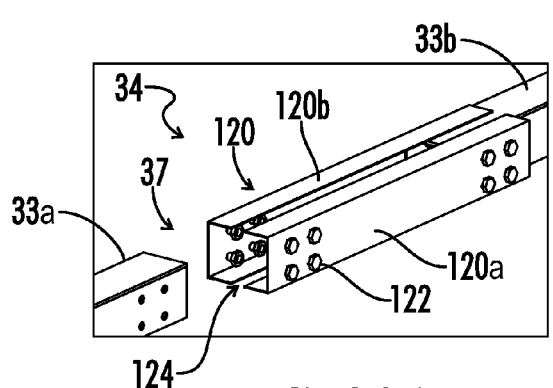
FIG. 20A illustrates a detail perspective view of an embodiment of a coupling for connecting adjacent raceway track members.
Figure 20B:
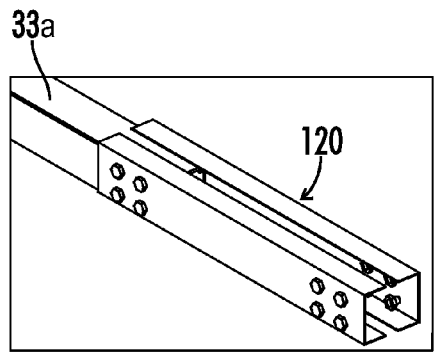
FIG. 20B illustrates a detail perspective view of an embodiment of a coupling for connecting adjacent raceway track members.
Figure 20C:
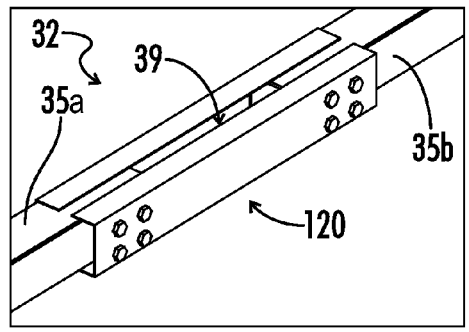
FIG. 20C illustrates a detail perspective view of an embodiment of a coupling for connecting adjacent raceway track members.
Figure 20D:
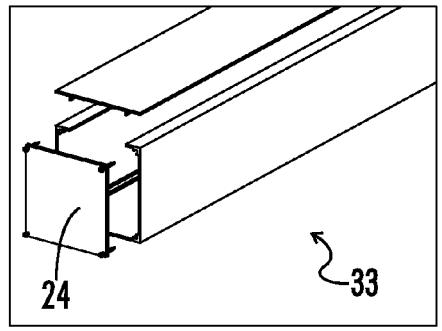
FIG. 20D illustrates a partially exploded perspective view of an embodiment of a raceway track member and removable cover.
Figure 21A:
FIG. 21A illustrates a side elevation view of a normal power raceway.
Figure 21B:
FIG. 21B illustrates a side elevation view of an emergency power raceway.
Figure 21C:
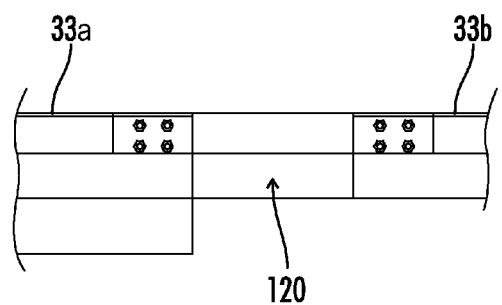
FIG. 21C illustrates a side elevation view of first and second raceway members positioned for attachment of a coupling.
Figure 21D:
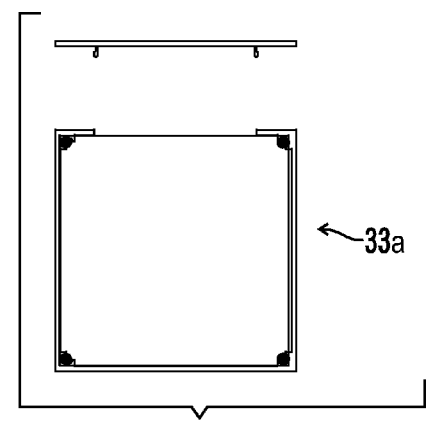
FIG. 21D illustrates an end view of an embodiment of a raceway member.
Figure 22A:
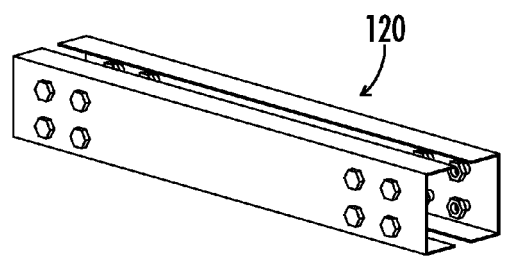
FIG. 22A illustrates a perspective view of an embodiment of a coupling for connecting adjacent raceway track members.
Figure 22B:
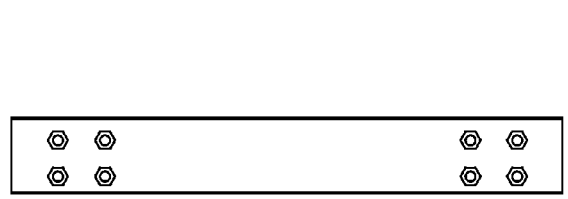
FIG. 22B illustrates a side elevation view of an embodiment of a coupling for connecting adjacent raceway track members.
Figure 22C:
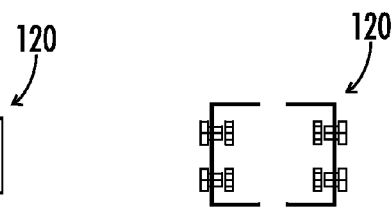
FIG. 22C illustrates an end view of an embodiment of a coupling for connecting adjacent raceway track members.

Referring to FIGS. 18A-18B and 19A-19B, in some embodiments, a headwall unit 200 may be provided in various configurations depending on the desired application. For example, a high acuity headwall unit 200a is illustrated in FIG. 18. High acuity headwall unit 200a includes a frame, a plurality of connectors at the top of the headwall unit 200, and a plurality of outlets for normal power, emergency power, medical air, oxygen, etc. A low acuity headwall unit 200b is illustrated in FIGS. 19A-19B. Low acuity headwall unit 200b includes fewer outlets than the high acuity version seen in FIGS. 18A-18B and may be more suitable for certain applications.

Each headwall unit 200 includes a headwall frame 111 with various components mounted thereon, including but not limited to those components listed identified in some embodiments in FIGS. 18A-18B and 19A-19B. Although the various components may be identified at some locations on the drawings, these illustrates are intended only as schematics of certain embodiments, and the invention is not limited to these embodiments. Various other configurations of component placement and selection on headwall unit 200 are encompassed within the scope of this invention. A unique aspect of the Universal Headwall embodiments is the "plug and play" functionality of a modular wall panel unit including critical life support connections. Each headwall unit includes connectivity to both normal power and emergency power local electrical raceways via mil-spec circular connectors with a bayonet locking feature as described above, thereby providing reliable power supply that may withstand mechanical strain on the headwall due to external forces. As such, critical life support equipment such as ventilators, Life Safety equipment, cardiac monitors, etc. may maintain connectivity to emergency power supply circuits via the robust connectors utilized on the headwall apparatus for connection to the raceways.

Figure 23:
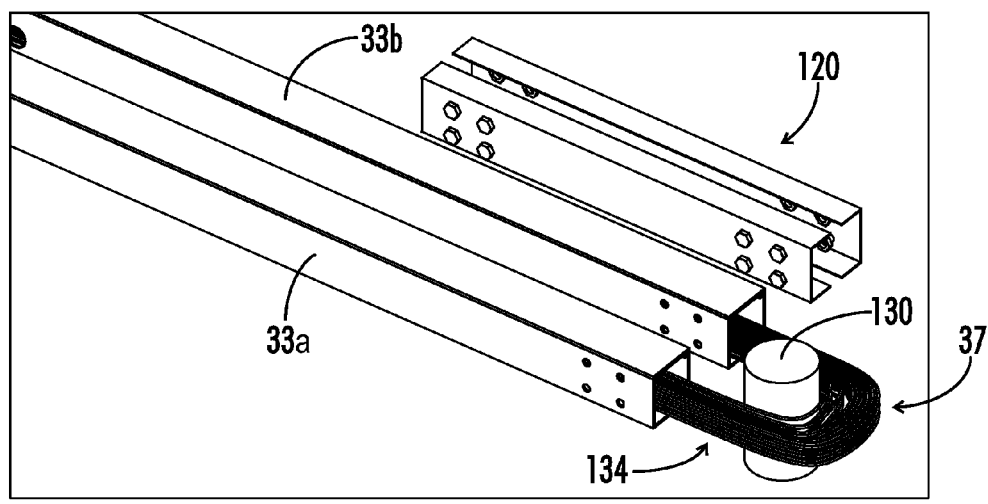
FIG. 23 illustrates an embodiment of a packaging configuration for a pre-wired electrical raceway having first and second raceway track members and coupling.

Referring further to FIGS. 20A-22C, in various embodiments, one or more couplings 120 may be used to mechanically connect adjacent raceways or raceway track members. In some embodiments, an emergency power raceway 32 includes multiple emergency power track members such as first emergency power track member 35a and second emergency power track member 35b, seen in FIG. 20C. Emergency power raceway 32 may include more than two emergency power track members in some embodiments. Emergency power track members 35a, 35b, etc. allow the overall emergency power raceway 32 to be folded while keeping internal wiring extending the entire length of the raceway intact. Folding of the raceway facilitates shipping. Similarly, normal power raceway 34 includes multiple normal power track members such as first normal power track member 33a and second normal power track member 33b. Normal power track members 33a, 33b, etc. allow the overall normal power raceway 34 to be folded while keeping internal wiring extending the entire length of the raceway intact. A first gap 37 is defined between first and second normal power track members 33a, 33b in some embodiments, as seen in FIG. 20 and FIG. 23. Similarly, a second gap 39 is defined between first and second emergency power track members 35a, 35b in some embodiments, as seen in FIG. 20C.

Each raceway track may include first and second electrical connectors, or electrical connector plugs, positioned at opposite ends of the raceway track for allowing electrical interconnection of adjacent raceways. For example, a normal power raceway 34, or normal power raceway track, includes a first normal power raceway connector 60a positioned near its first longitudinal end and a second normal power raceway connector 60b positioned near its second longitudinal end. A first raceway cable 134 extends through the raceway cable and electrically connects the first and second normal power raceway connectors 60a, 60b positioned the near longitudinally opposite ends of the normal power raceway 34, as seen in an example FIG. 3 and FIG. 7. The first raceway cable 134 may include a multi-strand electrical connector cable connecting multiple corresponding pins of each of first and second normal power raceway connectors 60a, 60b. In some embodiments, numerous normal power raceway cables extend between first and second normal power raceway connectors on normal power raceway 34, as seen in FIG. 23.

Similarly, a second raceway cable 136, or emergency raceway cable, extends internally through emergency raceway 32, or emergency raceway track, and electrically connects first and second emergency power raceway connectors 60c, 60d positioned near longitudinally opposite ends of emergency power raceway 32. Second raceway cable 136 includes one or more multistrand wires electrically interconnecting corresponding pins on first and second emergency power raceway connectors 60c, 60d in some embodiments. In some embodiments, numerous raceway cables or wires extend through the emergency power raceway 32 between first and second emergency power connectors 60c, 60d.

Adjacent raceway track members are mechanically joined onsite using coupling 120. Coupling 120 is dimensioned to interchangeably span normal power track gap 37 or emergency power track gap 39 in some embodiments. Each coupling 120 in some embodiments includes one or more U-shaped channels defining an interior space 124 shaped to correspond to an outer dimension of a corresponding raceway. In some embodiments, the height of interior space 124 is substantially equal to the outer height dimension of a raceway to be received in interior space 124. As such, a close fit may be attained between a coupling 120 and a corresponding raceway or raceway track member. In some embodiments, coupling 120 includes opposing channels 120a and 120b. Each channel defines an interior space configured to partially receive a portion of corresponding raceways or raceway track members. In some embodiments, a space 124 is defined between opposing channels 120a, 120b when installed on the raceways. In additional embodiments, first and second channels 120a, 120b abut against each other when installed on corresponding raceways and no space 124 is present. One or more raceway fasteners 122 may be inserted through each channel 120a, 120b and also through a corresponding raceway to mechanically attach a coupling 120 to the raceways.

Referring to FIG. 23, an embodiment of a packaging configuration, or packaging apparatus, for a pre-wired electrical raceway is illustrated. The packing apparatus includes a raceway comprising first and second raceway sections pre-wired with one or more electrical wires spanning therebetween. The wires may be pre-connected to one or more circular connectors disposed on each raceway section. A post 130 may be disposed in the packaging apparatus oriented along an axis substantially transverse to the longitudinal axis of each raceway section, wherein the raceway sections are oriented substantially parallel to each other. The post 130 includes a substantially cylindrical profile in some embodiments. Internal raceway wires, or electrical raceway cables 134 interconnecting raceway electrical plug connectors 60, may extend around post 130 across first gap 37 or second gap 39 such that post 130 provides a stress relief for the wires during shipment. Additionally, a coupling 120 may be packaged beside one of the raceway sections during shipment.

Thus, although there have been described particular embodiments of the present invention of a new and useful MODULAR ELECTRICAL RACEWAY FOR BUILDINGS, it is not intended that such references be construed as limitations upon the scope of this invention except as set forth in the following claims.

What is claimed is:
1. A prewired electrical raceway apparatus for modular installation in a building, comprising:
 a normal power track;
 an emergency power track positioned beside the normal power track;
 a first normal power connector disposed near a first end of the normal power track;
 a second normal power connector disposed near a second end of the normal power track opposite the first end;
 a first raceway cable extending through the normal power track electrically connecting the first and second normal power connectors;
 a branch connector disposed on the normal power track between the first normal power connector and the second normal power connector, the branch connector disposed on the normal power track having a different configuration than the first normal power connector and the second normal power connector, the branch connector disposed on the normal power track also comprising a female connector;
 a first emergency power connector disposed near a first end of the emergency power track;
 a second emergency power connector disposed near a second end of the emergency power track; and
 a second raceway cable extending through the emergency power track electrically connecting the first and second emergency power connectors.

2. The apparatus of claim 1 further comprising a branch connector disposed on the emergency power track between the first normal emergency power connector and the second emergency power connector, the branch connector disposed on the emergency power track having a different configuration than the first normal emergency connector and the second emergency power connector, the branch connector disposed on the emergency power track also comprising a female connector.

3. The apparatus of claim 2 further comprising coding above the branch connectors, the coding describing the branch connectors' functionality.

4. The apparatus of claim 3 wherein the coding comprises a bar code.

5. The apparatus of claim 1 wherein the normal power track has a different color then the emergency power track.

6. The apparatus of claim 2 wherein the branch connectors have different pin configurations than the normal power connectors and the emergency power connectors.

7. The apparatus of claim 1, the normal power track comprising first and second normal power track members.

8. The apparatus of claim 7, the emergency power track comprising first and second emergency power track members.

9. The apparatus of claim 7, further comprising a first gap defined between the first and second normal power track members.

10. The apparatus of claim 9, further comprising a portion of the first connector cable spanning the first gap.

11. The apparatus of claim 10, further comprising a first bend in the portion of the first connector cable spanning the first gap.

12. The apparatus of claim 11, wherein the first bend is approximately 180 degrees.

13. The apparatus of claim 11 further comprising a stress relief post positioned in the first bend.

14. The apparatus of claim 13, wherein the stress relief post is substantially cylindrical.

15. A prewired electrical raceway apparatus for modular installation in a building, comprising:
   a normal power track;
   an emergency power track positioned beside the normal power track;
   a first normal power connector disposed near a first end of the normal power track;
   a second normal power connector disposed near a second end of the normal power track opposite the first end;
   a first raceway cable extending through the normal power track electrically connecting the first and second normal power connectors;
   a normal branch connector disposed on the normal power track between the first normal power connector and the second normal power connector, the normal branch connector having a different configuration than the first normal power connector and the second normal power connector, the normal branch connector also comprising a female connector;
   a first emergency power connector disposed near a first end of the emergency power track;
   a second emergency power connector disposed near a second end of the emergency power track;
   a second raceway cable extending through the emergency power track electrically connecting the first and second emergency power connectors;
   an emergency branch connector disposed on the emergency power track between the first normal emergency power connector and the second emergency power connector, the emergency branch connector having a different configuration than the first normal emergency connector and the second emergency power connector, the emergency branch connector also comprising a female connector; and
   coding above the normal branch connector and the emergency branch connector, the coding describing the branch connectors' functionality.

16. The apparatus of claim 15 wherein the coding comprises one or more bar codes.

17. The apparatus of claim 15 wherein the normal power track has a different color then the emergency power track.

18. The apparatus of claim 17 wherein the emergency power track has a color chosen from orange and red.

19. A modular electrical raceway apparatus, comprising:
   a normal power raceway track including first and second normal power track members;
   a normal power connector cable positioned in the normal power raceway track;
   an emergency power raceway track positioned beside the normal power raceway track and including first and second emergency power track members;
   an emergency power connector cable positioned in the emergency power raceway track;
   a first normal power connector plug disposed on the first normal power track member;
   a second normal power connector plug disposed on the second normal power track member, the normal power connector cable electrically connecting the first and second normal power connector plugs;
   a first emergency power connector plug disposed on the first emergency power track member;
   a second emergency power connector plug disposed on the second emergency power track member, the emergency power connector cable electrically connecting the first and second emergency power connector plugs; and
   a branch connector disposed on the normal power track between the first normal power connector plug and the second normal power connector plug, the branch connector having a different configuration than the first normal power connector plug and the second normal power connector plug, the branch connector also comprising a female connector.

20. The apparatus of claim 19, further comprising a first gap defined between the first and second normal power raceway track members, wherein the normal power connector cable spans the first gap.

21. The apparatus of claim 19, further comprising a second gap defined between the first and second emergency power raceway track members, wherein the emergency power connector cable spans the second gap.

* * * * *